(12) United States Patent
Du et al.

(10) Patent No.: US 9,623,523 B2
(45) Date of Patent: Apr. 18, 2017

(54) HVAC ACTUATOR WITH TAPING FLANGE

(71) Applicant: Honeywell International Inc., Morristown, NJ (US)

(72) Inventors: Jack Du, Tianjin (CN); Kevin Graebel, Plymouth, MN (US); Bin Wang, Tianjin (CN); David J. Emmons, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 387 days.

(21) Appl. No.: 14/133,441

(22) Filed: Dec. 18, 2013

(65) Prior Publication Data

US 2015/0168005 A1    Jun. 18, 2015

(51) Int. Cl.
*F24F 13/02* (2006.01)
*F24F 11/04* (2006.01)
(Continued)

(52) U.S. Cl.
CPC ............... *B23P 19/04* (2013.01); *F24F 11/04* (2013.01); *F24F 13/1426* (2013.01);
(Continued)

(58) Field of Classification Search
CPC .......... F24F 7/01; F24F 11/0086; F24F 11/04; F24F 13/1426; F24F 13/1433;
(Continued)

(56) References Cited

U.S. PATENT DOCUMENTS 940,182 A    11/1909 Morgan et al.
1,613,322 A    1/1927 Goetz
(Continued)

FOREIGN PATENT DOCUMENTS

CN    101424504    5/2009
CN    201246519    5/2009
(Continued)

OTHER PUBLICATIONS

Smart-T and MT-Adapt-HW Mounting Adapter, 1 page, prior to Feb. 23, 2011.
(Continued)

*Primary Examiner* — Marc Norman
(74) *Attorney, Agent, or Firm* — Seager, Tufte & Wickhem, LLP

(57) ABSTRACT

An HVAC actuator coupleable to an HVAC component is disposed in or at an insulated duct. The HVAC actuator may include a housing and a taping flange. The taping flange may be spaced from the outer surface of the duct and adjacent to an outer surface of an insulated layer of the duct when the HVAC actuator is coupled to the HVAC component, and may be configured to facilitate taping of the HVAC actuator to the outer surface of the insulating layer. It may be shaped to provide a front-facing surface that is suitable for receiving tape to provide a seal between the taping flange and the outer surface of the insulating layer. In some cases, the taping flange may extend outward from the housing around the entire perimeter of the housing. The taping flange may be formed integrally with the housing, or it formed separately and coupled to the housing.

20 Claims, 20 Drawing Sheets

(51) Int. Cl.
*B23P 19/04* (2006.01)
*F24F 13/14* (2006.01)
*F24F 11/00* (2006.01)

(52) U.S. Cl.
CPC .......... *F24F 2011/0056* (2013.01); *F24F 2011/0091* (2013.01); *Y10T 29/49826* (2015.01)

(58) Field of Classification Search
CPC .......... F24F 2011/0056; B23P 19/04; Y10T 29/42826; Y10T 29/4917; H01R 13/447
See application file for complete search history.

(56) References Cited

U.S. PATENT DOCUMENTS

| | | |
|---|---|---|
| 2,465,162 A | 3/1949 | Lockwood |
| 2,616,452 A | 11/1952 | Clay et al. |
| 2,745,360 A | 5/1956 | Lunde |
| 3,117,257 A | 1/1964 | Stone |
| 3,143,137 A | 8/1964 | Muller |
| 3,262,027 A | 7/1966 | Zaleske et al. |
| 3,276,480 A | 10/1966 | Kennedy |
| 3,279,744 A | 10/1966 | Fieldsen et al. |
| 3,295,079 A | 12/1966 | Brown |
| 3,521,659 A | 7/1970 | Seger |
| 3,727,160 A | 4/1973 | Churchill |
| 3,817,452 A | 6/1974 | Dean, Jr. |
| 3,847,210 A | 11/1974 | Wells |
| 4,088,150 A | 5/1978 | Serratto |
| 4,319,714 A | 3/1982 | Moulene et al. |
| D267,335 S | 12/1982 | Axel et al. |
| 4,379,605 A | 4/1983 | Hoffman |
| 4,487,363 A | 12/1984 | Parker et al. |
| 4,534,538 A | 8/1985 | Buckley et al. |
| 4,549,446 A | 10/1985 | Beeson |
| D286,907 S | 11/1986 | Hilpert et al. |
| 4,671,540 A | 6/1987 | Medvick et al. |
| 4,683,453 A | 7/1987 | Vollmer et al. |
| 4,691,689 A | 9/1987 | Shepherd et al. |
| 4,732,318 A | 3/1988 | Osheroff |
| D295,280 S | 4/1988 | Walser |
| 4,805,870 A | 2/1989 | Mertz |
| 4,829,447 A | 5/1989 | Parker et al. |
| 4,836,497 A | 6/1989 | Beeson |
| 4,841,733 A | 6/1989 | Dussault et al. |
| 5,052,537 A | 10/1991 | Tysver et al. |
| 5,133,265 A | 7/1992 | Lahti et al. |
| 5,236,006 A | 8/1993 | Platusich et al. |
| 5,249,596 A | 10/1993 | Hickenlooper, III et al. |
| 5,338,221 A | 8/1994 | Bowen et al. |
| D359,103 S | 6/1995 | Bouc et al. |
| 5,518,462 A | 5/1996 | Yach |
| 5,540,414 A | 7/1996 | Giordani et al. |
| 5,551,477 A | 9/1996 | Kanno et al. |
| 5,564,461 A | 10/1996 | Raymond, Jr. et al. |
| 5,581,232 A | 12/1996 | Tanaka et al. |
| 5,588,682 A | 12/1996 | Breese |
| 5,634,486 A | 6/1997 | Hatting et al. |
| 5,806,555 A | 9/1998 | Magno, Jr. |
| 5,808,534 A | 9/1998 | Laffey |
| 5,819,791 A | 10/1998 | Chronister et al. |
| 5,835,981 A | 11/1998 | Smith |
| 5,944,224 A | 8/1999 | Hodge et al. |
| 5,954,088 A | 9/1999 | Huang |
| 6,073,907 A | 6/2000 | Schreiner, Jr. et al. |
| 6,422,258 B1 | 7/2002 | DuHack et al. |
| D480,450 S | 10/2003 | Saadi et al. |
| 6,684,901 B1 | 2/2004 | Cahill et al. |
| 6,742,765 B2 | 6/2004 | Takano et al. |
| 6,789,781 B2 | 9/2004 | Johnson et al. |
| D498,821 S | 11/2004 | Nortier |
| 6,848,672 B2 | 2/2005 | Cross et al. |
| 6,880,806 B2 | 4/2005 | Haikawa et al. |
| 6,920,896 B2 | 7/2005 | Kerger et al. |
| 6,932,319 B2 | 8/2005 | Kowalski |
| 6,994,320 B2 | 2/2006 | Johnson et al. |
| 7,024,527 B1 | 4/2006 | Ohr |
| 7,036,791 B2 | 5/2006 | Wiese |
| 7,041,902 B1 | 5/2006 | Savicki, Jr. et al. |
| 7,048,251 B2 | 5/2006 | Schreiner |
| 7,131,635 B2 | 11/2006 | Oh |
| 7,137,408 B2 | 11/2006 | Royse |
| 7,188,481 B2 | 3/2007 | DeYoe et al. |
| D543,003 S | 5/2007 | Helmetsie |
| 7,260,899 B2 | 8/2007 | Jones |
| D552,643 S | 10/2007 | Bonomi |
| 7,347,716 B2 | 3/2008 | Osterhaus et al. |
| 7,354,319 B2 | 4/2008 | Camino et al. |
| D571,290 S | 6/2008 | Gebhart et al. |
| 7,395,718 B2 | 7/2008 | Obermeier |
| 7,428,626 B2 | 9/2008 | Vega |
| 7,470,143 B2 | 12/2008 | Osborn, Jr. et al. |
| D587,211 S | 2/2009 | Greenslade |
| D600,319 S | 9/2009 | Downing |
| 7,600,327 B2 | 10/2009 | Sharp |
| 7,631,155 B1 | 12/2009 | Bono et al. |
| 7,640,677 B2 | 1/2010 | Vock et al. |
| D609,319 S | 2/2010 | Ohno et al. |
| D610,655 S | 2/2010 | Schmidt |
| D614,150 S | 4/2010 | Crites |
| 7,704,008 B2 | 4/2010 | Shinozaki et al. |
| D616,067 S | 5/2010 | Cavagna |
| 7,708,254 B2 | 5/2010 | Hertzog |
| D621,909 S | 8/2010 | Parsons et al. |
| 7,769,861 B2 | 8/2010 | Bendich et al. |
| 7,805,564 B2 | 9/2010 | Matsunami et al. |
| D629,069 S | 12/2010 | Parsons et al. |
| D629,871 S | 12/2010 | Marinoni et al. |
| D631,944 S | 2/2011 | Karmel et al. |
| D634,813 S | 3/2011 | Hernandez, IV |
| 7,914,872 B2 | 3/2011 | Leonard et al. |
| 7,937,527 B2 | 5/2011 | Matsunami et al. |
| 8,051,244 B2 | 11/2011 | Matsunami et al. |
| D650,337 S | 12/2011 | Bonomi |
| 8,083,205 B2 | 12/2011 | Sneh |
| D654,523 S | 2/2012 | Iranyi et al. |
| 8,122,911 B2 | 2/2012 | Wark |
| 8,341,350 B2 | 12/2012 | Jess et al. |
| 8,353,716 B2 | 1/2013 | Keswani |
| D675,714 S | 2/2013 | Nguyen |
| 8,386,708 B2 | 2/2013 | Jess |
| D680,141 S | 4/2013 | Sannomiya |
| D686,297 S | 7/2013 | Laugen et al. |
| D687,070 S | 7/2013 | Liao |
| D691,703 S | 10/2013 | Iranyi et al. |
| D697,585 S | 1/2014 | Liu et al. |
| 8,632,054 B2 | 1/2014 | Carlson et al. |
| 8,645,662 B2 | 2/2014 | Burton et al. |
| 2004/0099833 A1 | 5/2004 | Haikawa et al. |
| 2008/0116288 A1 | 5/2008 | Takach et al. |
| 2011/0220009 A1 | 9/2011 | Betts et al. |
| 2011/0240893 A1 | 10/2011 | Windgassen |
| 2012/0199776 A1 | 8/2012 | Krueter |
| 2012/0325338 A1 | 12/2012 | Pettinaroli et al. |
| 2013/0049644 A1* | 2/2013 | Neumann ........... F24F 13/1426 318/15 |
| 2013/0054932 A1 | 2/2013 | Acharya et al. |
| 2013/0187073 A1 | 7/2013 | Carlson et al. |
| 2013/0187376 A1* | 7/2013 | Williams ............ F16L 41/08 285/197 |
| 2013/0333502 A1 | 12/2013 | Barton et al. |
| 2013/0333784 A1 | 12/2013 | Marak et al. |
| 2013/0334325 A1 | 12/2013 | Marak et al. |
| 2013/0337736 A1 | 12/2013 | Marak et al. |

FOREIGN PATENT DOCUMENTS

| | | |
|---|---|---|
| CN | 203051926 | 7/2013 |
| DE | 10322832 | 12/2004 |
| EP | 0021885 | 1/1981 |
| EP | 0057780 | 8/1982 |
| EP | 0612950 | 8/1994 |
| EP | 1235128 | 8/2002 |

(56) References Cited

FOREIGN PATENT DOCUMENTS

| | | |
|---|---|---|
| EP | 1672261 | 6/2006 |
| EP | 1701108 | 9/2006 |
| EP | 1967777 | 9/2008 |
| EP | 2017512 | 1/2009 |
| EP | 2088529 | 8/2009 |
| FI | EP 0779476 A2 * 6/1997 .............. F23L 13/02 |
| GB | 2468292 | 9/2010 |
| JP | 11280948 | 10/1990 |
| JP | 3219185 | 9/1991 |
| JP | 2007108106 | 4/2007 |
| KR | 2003013488 | 2/2003 |
| WO | WO 2010/100403 | 9/2010 |
| WO | WO 2011/043663 | 4/2011 |
| WO | WO 2011/066328 | 6/2011 |

OTHER PUBLICATIONS

Air Torque, "3-Position 4$^{th}$ Generation Actuators (90° Rotation)," 2 pages, prior to Aug. 2, 2013.
Air Torque, "4$^{th}$ Generation Pneumatic Actuator," 20 pages, prior to Aug. 2, 2013.
Bryant, "Healthcare Solutions," 12 pages, prior to Aug. 5, 2013.
CHROMalytic Technology, "Actuators and Accessories; Air Actuators," Australian Distributors; Importers & Manufacturers, pp. 194-211, Downloaded Feb. 2012.
Search Report for Corresponding Application No. 12156608.7-2422 Dated Jun. 1, 2012.
U.S. Appl. No. 29/477,001, filed Dec. 27, 2013.
U.S. Appl. No. 13/032,856, filed Feb. 23, 2011.
U.S. Appl. No. 13/358,453, filed Jan. 25, 2012.
U.S. Appl. No. 13/523,706, filed Jun. 14, 2012.
U.S. Appl. No. 13/523,724, filed Jun. 14, 2012.
U.S. Appl. No. 13/523,742, filed Jun. 14, 2012.
U.S. Appl. No. 13/523,754, filed Jun. 14, 2012.
U.S. Appl. No. 14/133,429, filed Dec. 18, 2013.
U.S. Appl. No. 14/133,456, filed Dec. 18, 2013.
U.S. Appl. No. 14/133,467, filed Dec. 18, 2013.
U.S. Appl. No. 14/133,482, filed Dec. 18, 2013.
U.S. Appl. No. 29/408,681, filed Dec. 15, 2011.
Damper Actuator Google Image Search Results: "https://www.google.com/search?q=damper+actuator&tbm=ish&source= . . . " 12 pages, Dec. 18, 2013.
Electric Actuator MOD.VB015 "Maintenance and Instillation Instructions of Valbia Electric Actuators" Sections 1.0-8.0 6 pages, downloaded Dec. 18, 2013.
Honeywell, "Dampers Actuators and Valves," Application and Selection Guide, 295 pages, Jan. 2011.
Honeywell, "Excel 10 W7751H3007 VAV Actuators," Installation Instructions, 10 pages, 2007.
Honeywell, "M5410 C1001/L1001 Small on/off Linear Valve Actuators," Product Data, 4 pages, 2010.
Honeywell, "M6061 Rotary Valve Actuators," Product Data, 6 pages, 2011.
Honeywell, "ML6420A30xx/ML7420A60xx," Electric Linear Valve Actuators, Installation Instructions, 2 pages, 2010.
Honeywell, "ML6435B/ML7435E Electric Linear Actuators for Floating/Modulating Control," Installation Instructions, 2 pages, 2008.
Honeywell, "MT4-024/MT4-230 MT8-024/MT8-230, Small Linear Thermoelectric Actuators," Product Data, 5 pages, 2009.
Honeywell, "MT-Clip—Mounting Clips for MT4/MT8," Mounting Instructions, 1 page, prior to Feb. 23, 2011.
Honeywell, "MT-Clip-ATP—Mounting Clips for MT4/MT8," 2 pages, 2006.
Honeywell, "N20xx/N34xx Non-spring Return Direct-Coupled Damper Actuators," Wiring, 4 pages, 2012.
Honeywell, "Small Linear Thermoelectric Actuator, MT4-024/MT4-230/MT8-024/MT8-230," Mounting Instructions, 2 pages, 2006.
Honeywell, "Small Linear Thermoelectric Actuator, MT4-024/MT4-230/MT8-024/MT8-230," Mounting Instructions, 2 pages, 2007.
Honeywell, "VC2, VC4, VC60, VC8 On-Off Actuator for VC Series Balanced Hydronic Valves," Installation Instructions, 8 pages, 2011.
Honeywell, "VC6800, VC6900 Series Floating Control Valves," Product Data, 6 pages, Nov. 1996.
Honeywell, M5003A, 2 pages, Sep. 2010.
Honeywell, M6410C/L M7410C, 2 pages, prior to Feb. 23, 2011.
Honeywell, M7061 Installation Instructions, 2 pages, 2003.
HVAC Actuator Google Image Search Results: "https://www.google.com/search?q=damper+actuator&tbm=ish&source= . . . " 12 pages, Dec. 18, 2013.
Johnson Controls, "VA-8122 Proportional Valve Actuator," Product/Technical Bulletin, VA-8122, May 2013.
Kromschroder, "Actuators IC 20, IC 40," 3.1.6.4 Edition 05.05 GB, 6 pages, prior to Aug. 8, 2013.
Meto-Fer Automation, "Rotary Actuators," 18 pages, Sep. 2012.
Siemens, "Room Controller RXC32.1/RXC32.5 for VAV Systems with LonMark-Compatible Bus Communication," 14 pages, Jan. 16, 2012.
Siemens, "SQS82 Electronic Valve Actuator," Installation Instructions, Document No. 129-157, Rev. 5, Oct. 2000.
Solidyne, "SMRT Actuator," 00-SMRT-1 Rev-0, 7 pages, 2009.
Valbia Electric Actuators, Bonomi USA, Inc. "General Specifications," N.105, 4 pages, downloaded Dec. 18, 2013.
VICI Valco Instruments Co. Inc., "Multiposition Microelective Valve Actuators Models EMH, EMT, ECMH, and ECMT," VICI AG International, 9 pages, Downloaded Feb. 2012. TN-415 Dec. 2007.
Wilcoxon, "iT Accessories," Rev. A, 2 pages, Nov. 2004.
Aprilaire, Zone Control System, "Existing Home Damper Installation Instructions", 1 page, 2011.
Aprilaire, Zone Control System, "Rectangular Damper Installation Instructions", 2 pp., 2000.
Aprilaire, Zone Control System, "Round Damper Installation Instructions", 2 pp., 2011.
DZK, "Daikon Zoning Kit", Installation Manual, Rev 1.00, 60 pp., Nov. 2013.
Jackson Systems, "BZD-XX Round Single Blade Barometric Zone Damper Installation Instructions", 4 pp., downloaded Sep. 15, 2016.
Johnson Controls, "Dampers and Actuators Catalog", 150 pp., 2013.
Siemens, "OpenAir Electronic Damper Actuator GDE/GLB Rotary Non-spring Return", Installation Instructions, Document No. 129-367, 7 pp., Oct. 1, 2013.
Siemens, "OpenAir GEB Series", Installation Instructions, Document No. 129-308, 8 pp., Jan. 21, 2013.
Trane, "VariTrac Dampers", Installation Guide, 14 pp., Sep. 2010.

* cited by examiner

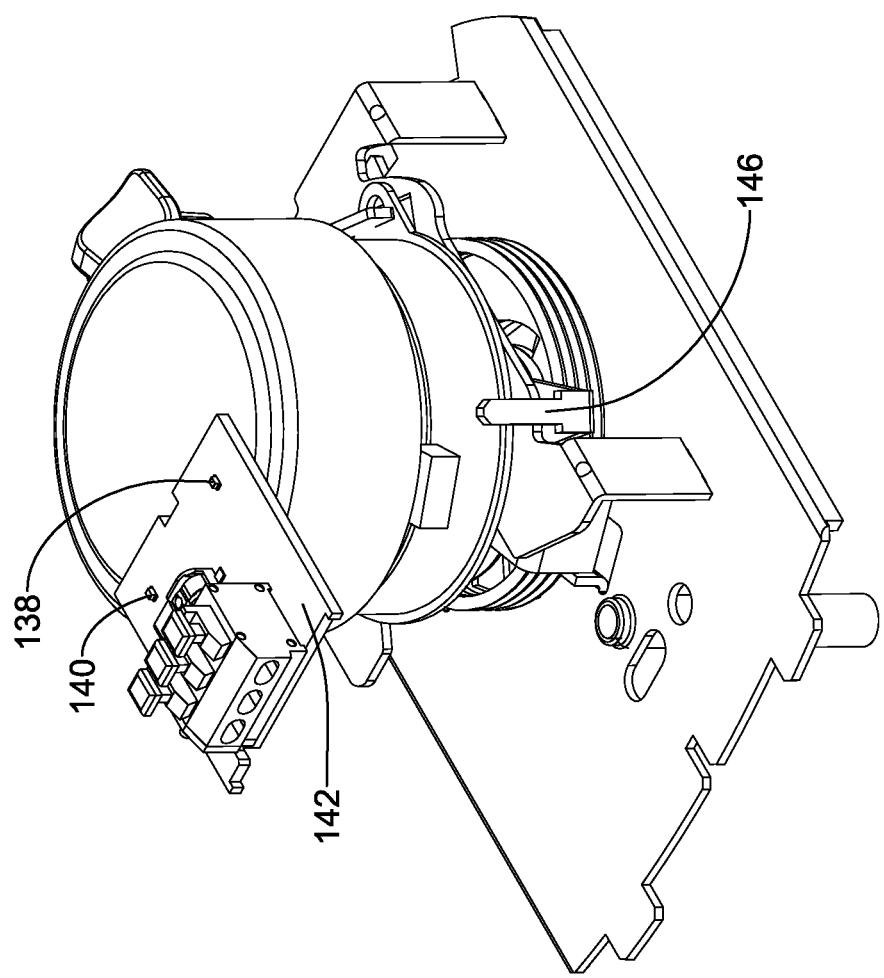

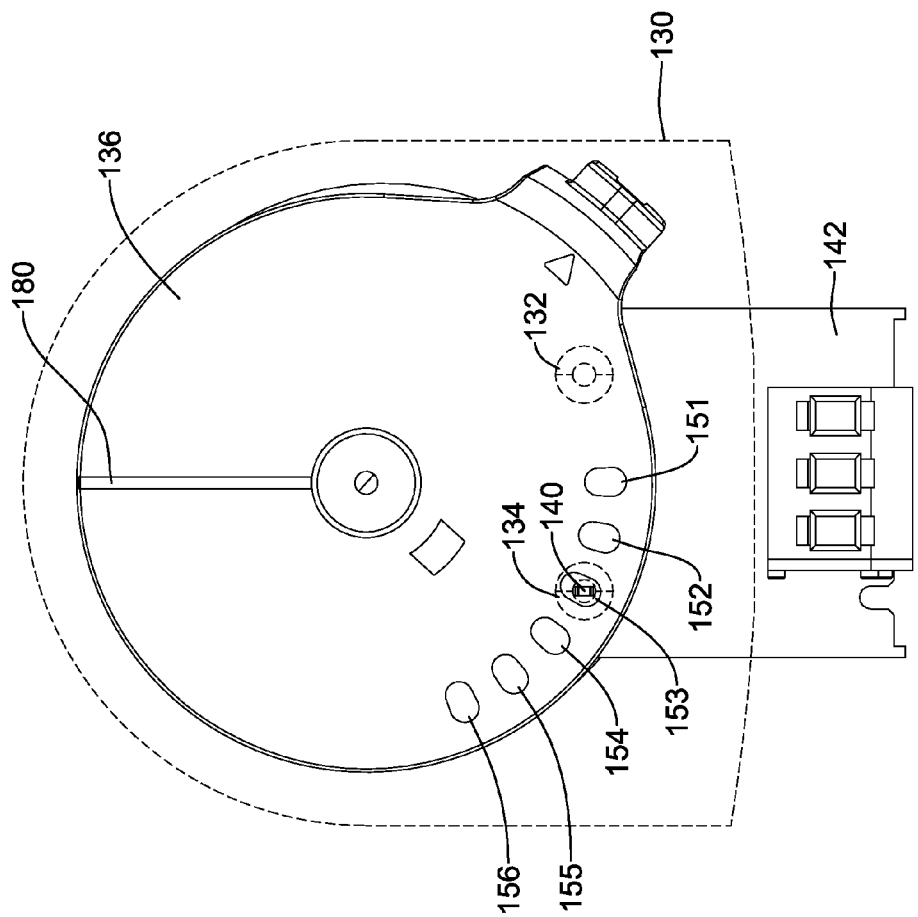

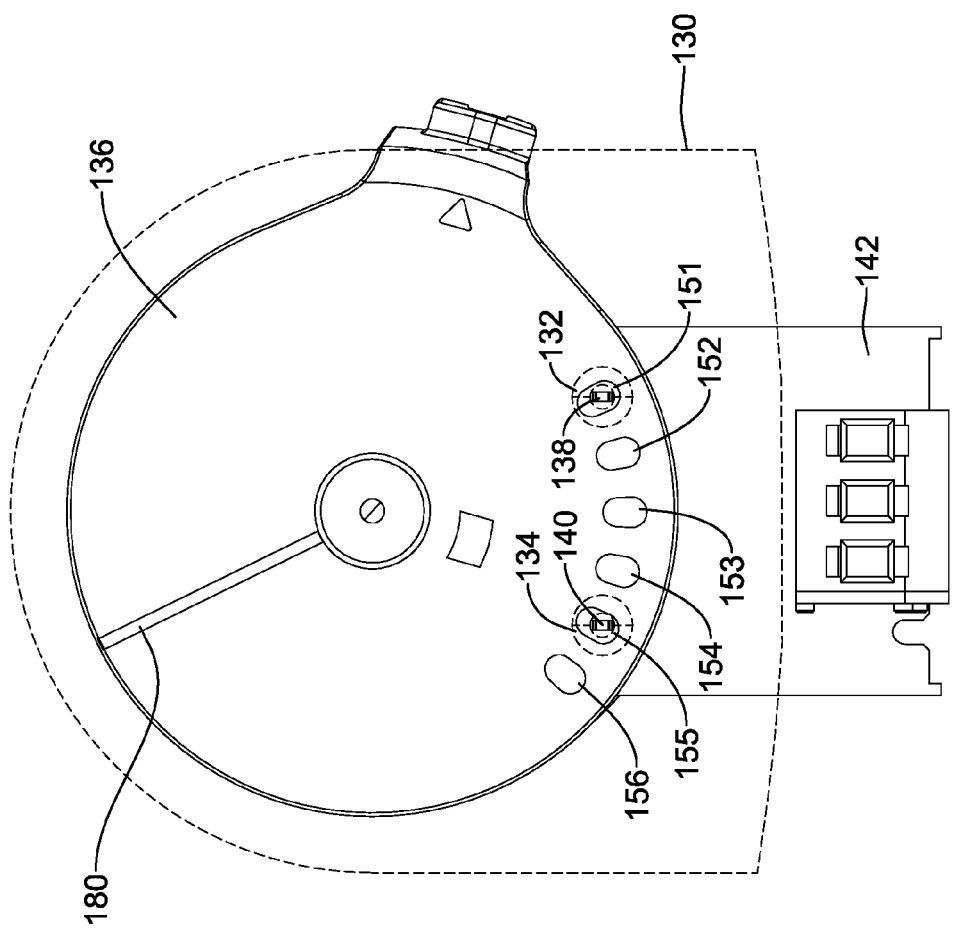

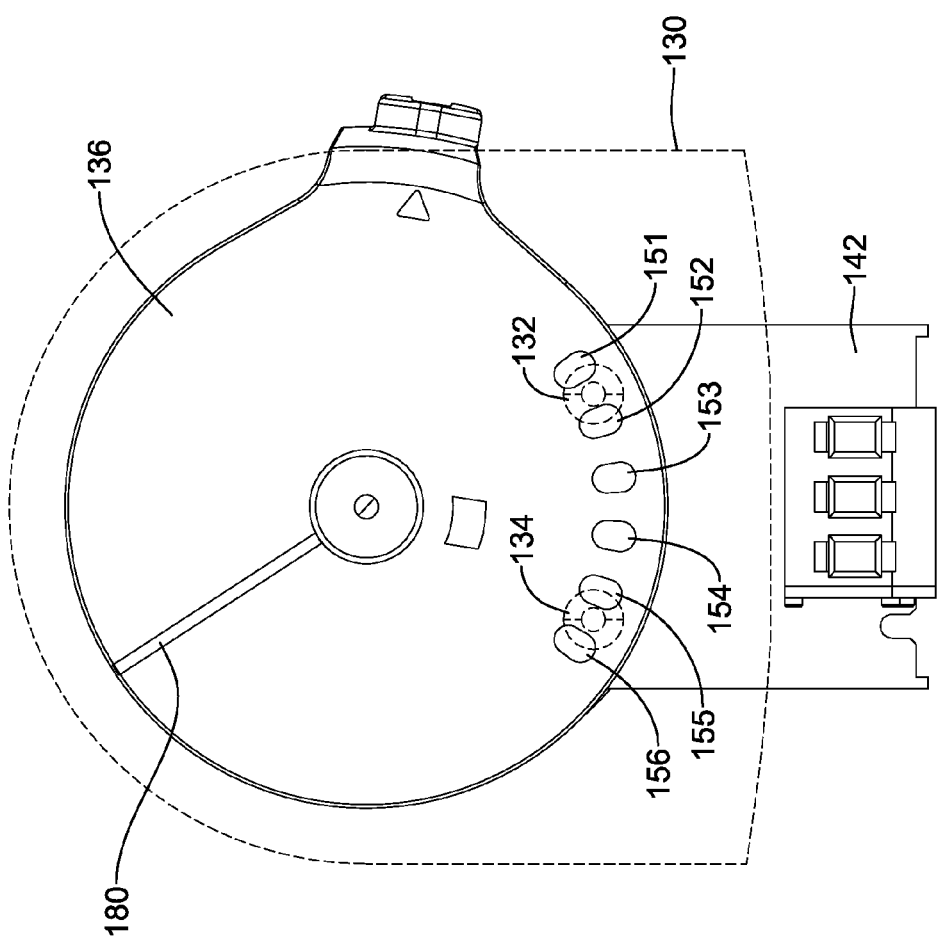

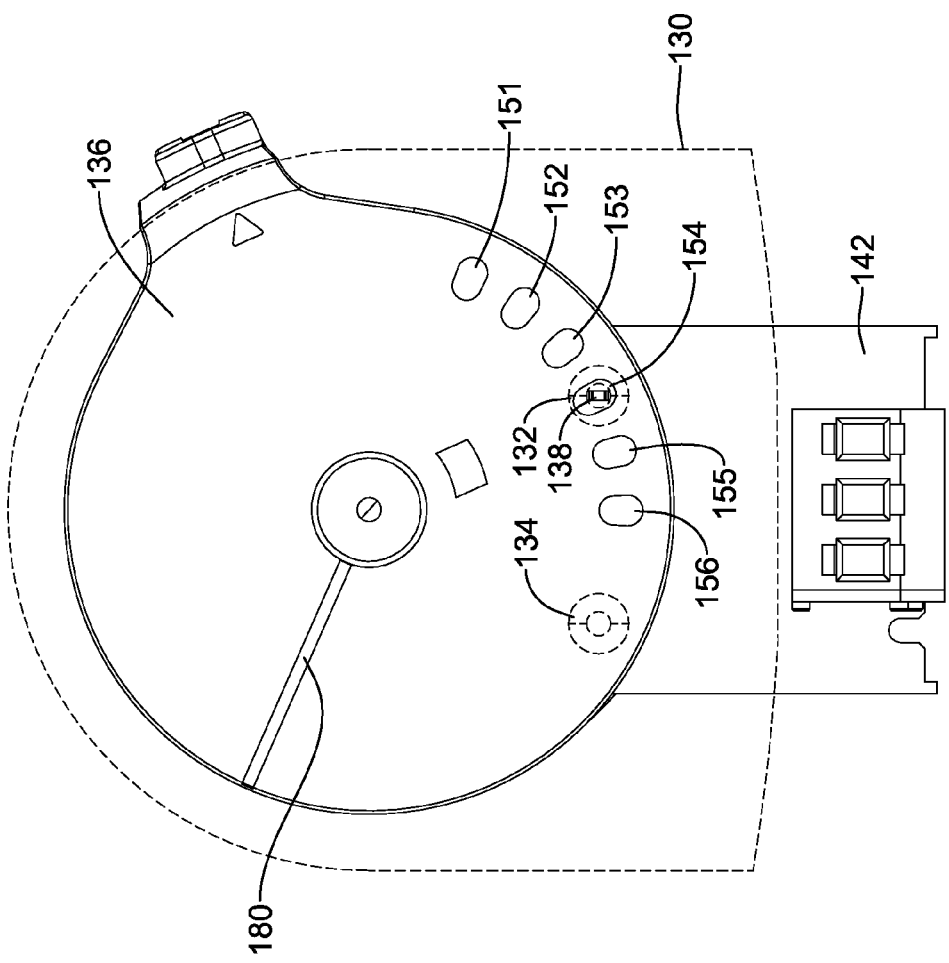

HVAC ACTUATOR WITH TAPING FLANGE

TECHNICAL FIELD

The disclosure relates generally to actuators, and more particularly, to HVAC actuators for use in HVAC systems.

BACKGROUND

Heating, ventilation and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. The HVAC components may include, for example, a furnace, an air conditioner, and associated ductwork, such as in a forced air system, and/or a boiler, radiators, and associated plumbing, such as in a hydronic heating system, as well as many other possible components and configurations.

In forced air systems, the conditioned air is typically provided by a furnace and/or air conditioner through a plenum to a network of supply air ducts that distribute the conditioned air throughout the building. A network of return air ducts is often used to return air from the building back to the furnace and/or air conditioner. A blower is used to draw the return air through the return air ducts, and drive the return air through the furnace and/or air conditioner and into the supply air ducts via the plenum. In some cases, some of the air is replaced over time with fresh outside air, often through an energy recovery ventilator or the like. Airflow in a force air system may be controlled in part through the use of one or more dampers.

In a zoned system, conditioned air is delivered to each zone based on the heat load in that zone. Dampers are typically placed in the supply air ducts that feed each zone. By activating damper actuators, the conditioned air may be delivered to only those zones that are calling for conditioned air. In some cases, a bypass damper may be placed in a bypass duct that extends between the supply duct (or the plenum) and the return air duct. This may allow some of the supply air to pass directly to the return air duct when the pressure in the plenum rises above a threshold value, such as when only a small number of zones are calling for conditioned air. A ventilator may also be controlled by one or more dampers. In each of these cases (zoning, bypass, ventilation) and others, a damper actuator may be used to provide automatic control of a damper. HVAC actuators are also employed in other contexts as well. For example, a hydronic heating or cooling system may employ HVAC actuators to control valves that govern the flow of fluids in the system.

SUMMARY

The disclosure relates generally to actuators, and more particularly, to HVAC actuators for use in HVAC systems. In one example, an HVAC actuator may be coupleable to an HVAC component disposed in or at an insulated duct. The insulated duct may include a duct having a duct wall, an outer surface of the duct, an insulating layer around the outer surface of the duct, and an outer surface of the insulating layer. The HVAC actuator may include a coupling mechanism configured to couple the HVAC actuator to the HVAC component, a housing having a back side facing the duct and a front side facing away from the duct, and a taping flange. The taping flange may be configured to extend transversely away from the housing and provide a taping surface facing away from the duct. The taping flange may further be configured to be spaced from the outer surface of the duct and adjacent to the outer surface of the insulated layer of the duct when the HVAC actuator is coupled to the HVAC component. The taping flange may be configured to facilitate taping of the HVAC actuator to the outer surface of the insulating layer. It may be shaped to provide a front-facing surface that is suitable for receiving tape to provide a seal between the taping flange and the outer surface of the insulating layer. In some cases, the taping flange may extend outward from the housing around the entire perimeter of the housing. The taping flange may be formed integrally with the housing, or it formed separately from the housing and coupled to the housing.

In another example, an HVAC actuator may be coupleable to an HVAC component disposed in or at an insulated duct. The insulated duct may include a duct having duct walls, an outer surface of the duct, an insulating layer around the outer surface of the duct, and an outer surface of the insulating layer. The HVAC actuator may include an output shaft, a drive mechanism for rotating the output shaft, a controller for controlling the drive mechanism, and a coupling mechanism configured to operatively couple the output shaft of the HVAC actuator to an input shaft of the HVAC component when the HVAC actuator is coupled to the HVAC component. The HVAC actuator also may include a stop that is configured to engage the duct wall when the HVAC actuator is coupled to the HVAC component. The stop may help prevent the HVAC actuator from rotating relative to the HVAC component when the drive mechanism of the HVAC actuator is rotating the output shaft. The HVAC actuator may also include a taping flange configured to be spaced from the outer surface of the duct and adjacent to the outer surface of the insulated layer of the duct when the HVAC actuator is coupled to the HVAC component.

In some instances, the HVAC actuator may include a housing having a back side facing the duct and a front side facing away from the duct. The taping flange may extend outward from the housing and provide a front-facing surface that is suitable for receiving tape to provide a seal between the taping flange and the outer surface of the insulating layer. The taping flange may be formed integrally with the housing, or it may be formed separately from the housing and coupled to the housing.

An illustrative method for installing an HVAC actuator for driving an HVAC damper that is disposed in an insulated duct may include operatively coupling an output shaft of the HVAC actuator to an input shaft of the HVAC damper, and providing tape between a taping flange of the HVAC actuator and the outer surface of the insulating layer of the duct to form a seal. The method may also include tucking at least part of the insulating layer under the taping flange before providing tape between the taping flange of the HVAC actuator and the outer surface of the insulating layer of the duct to form a seal. In some cases, the method may include inserting a stop of the HVAC actuator through an aperture in the duct wall before operatively coupling the output shaft of the HVAC actuator to the input shaft of the HVAC damper.

The above summary is not intended to describe each and every example or every implementation of the disclosure. The Description that follows more particularly exemplifies various illustrative embodiments.

BRIEF DESCRIPTION OF THE FIGURES

The following description should be read with reference to the drawings. The drawings, which are not necessarily to scale, depict several examples and are not intended to limit the scope of the disclosure. The disclosure may be more completely understood in consideration of the following description with respect to various examples in connection with the accompanying drawings, in which:

FIG. 9 is a schematic perspective view of the illustrative HVAC actuator of FIG. 8 with the aperture wheel also removed;

FIGS. 10A-E are schematic perspective front views of the illustrative HVAC actuator showing the aperture wheel disposed at different orientations relative to the light sources;

DESCRIPTION

Figure 1:
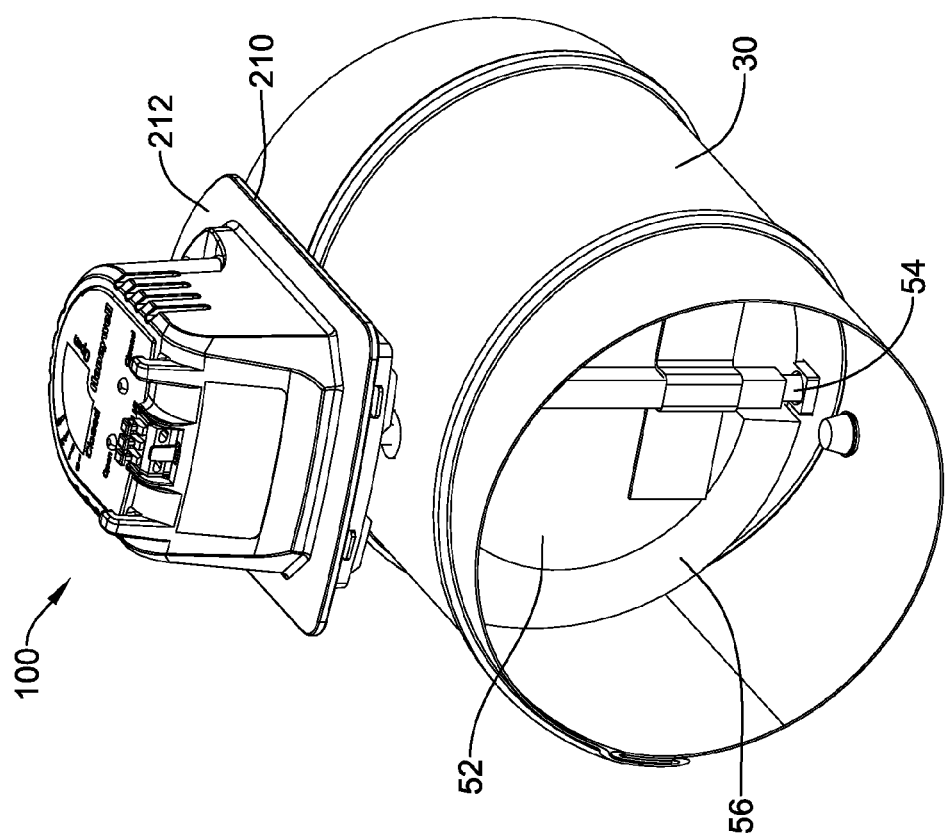
FIG. 1 is a schematic perspective view of a portion of a duct with a damper assembly driven by an illustrative HVAC actuator.

The following description should be read with reference to the drawings, in which like elements in different drawings are numbered in like fashion. The drawings, which are not necessarily to scale, depict selected examples and are not intended to limit the scope of the disclosure. Although examples of construction, dimensions, and materials are illustrated for the various elements, those skilled in the art will recognize that many of the examples provided have suitable alternatives that may be utilized.

HVAC systems may employ actuators for a variety of purposes, including, for example, the control of dampers in forced air systems. HVAC dampers may be employed in a number of applications, with each application having its own specific requirements that may differ from the requirements of other applications. For example, zoning dampers may be "normally open," meaning that the flow of air in the duct is generally not restricted by the damper unless the damper has specifically been commanded to be closed. In contrast, ventilation or bypass dampers may be "normally closed," generally preventing the flow of air unless commanded open. Normally open and normally closed dampers may be configured to revert to their normal (open or closed) state in the event of a loss of power and/or command signal. In some cases, a damper may include a spring or other bias mechanism that is configured to return to the damper to the normal (open or closed) state. In other cases, a damper may be powered in both directions by a motor or the like.

While some dampers may be controlled between a fully open and a fully closed state, in some applications it may be desirable for the damper to be controllable between, for example, an open state and a state that is not completely closed. This may help, for example, to maintain a minimum airflow to a zone of a building. Similarly, it may be desirable to prevent a damper from opening completely to help limit airflow to a zone of a building. In such cases, it may be desirable to establish a range stop to prevent the damper from fully closing or fully opening, depending on the application.

The variety of use scenarios for actuated dampers in HVAC systems often requires a technician's diligence in considering and properly accounting for the particular requirements of the damper and damper actuator being installed or maintained. The present disclosure provides improved damper actuators with features that make their installation and maintenance easier. Such features include, but are not limited to, visual indicators that indicate the position and/or status of the actuator, adjustment mechanisms that are easy to access and use, and structures that help guide aspects of installation.

While the present disclosure largely describes HVAC actuators in the application of damper actuators, it is contemplated that features described herein have utility for other applications, such as HVAC actuators for valves and the like. Furthermore, it is contemplated that various features of HVAC actuators of the present disclosure may be combined in any compatible combination, and that the present disclosure should not be considered to be limited to only the specific combinations of features explicitly illustrated.

FIG. 1 is a schematic perspective view of a portion of a duct 30 with a damper assembly driven by an illustrative HVAC actuator 100. The damper components other than the HVAC actuator 100 may be referred to collectively as an HVAC component, to which the HVAC actuator may be coupled. The damper assembly may include a damper blade 52 rotatably mounted on a damper shaft 54 between a closed state or position (illustrated) and an open state or position. In the fully closed state, damper blade 52 may be disposed in close contact with one or more damper stops 56 attached to the duct 30, with the damper blade and damper stops substantially closing the duct to the flow of air. In the schematic arrangement illustrated in FIG. 1, the plane of the damper blade 52 is substantially perpendicular to the longitudinal axis of duct 30 when the damper is fully closed, however, this is not necessary, and a damper assembly may be configured with a damper blade and damper stops structured to substantially close the duct with the damper blade at a different angle relative to the duct. In the fully open state, generally the plane of the damper blade 52 will be parallel with the airflow in the duct 30, which generally would be the case with the plane of the damper blade being parallel to the longitudinal axis of the duct.

Figure 2:
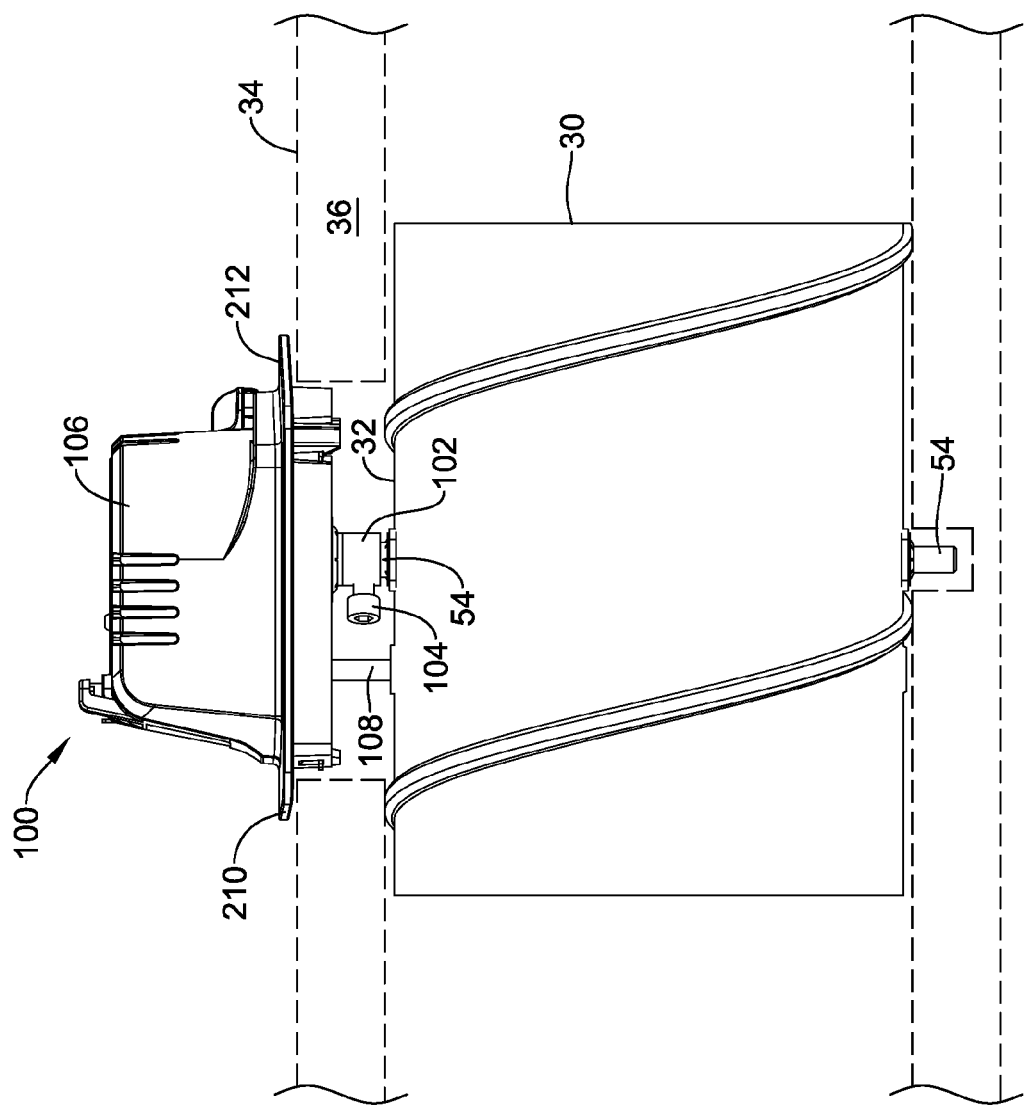
FIG. 2 is a schematic side view of the duct, damper assembly and illustrative HVAC actuator of FIG. 1.

FIG. 2 is a schematic side view of duct 30, damper assembly and illustrative HVAC actuator 100 of FIG. 1. Damper shaft 54, which may also be referred to as an input shaft, may extend out of the duct wall through an aperture in the duct wall. The illustrative HVAC actuator 100 includes a rotatable output shaft 102 that may be operatively coupled to the end of damper shaft 54 as illustrated in FIG. 2, such that rotational torque effective to rotate the damper shaft 54 and damper blade 52 may be imparted by the output shaft 102. In the example shown, a set screw 104 may be employed as a coupling mechanism for securing the output shaft 102 of the illustrative HVAC actuator to the damper shaft 54, but this is not limiting and other suitable coupling mechanism may be employed as desired. Output shaft 102 may have a full range of rotation between a first end position and a second end position, which may correspond to the fully closed and fully open states of the damper (or vice-versa). HVAC actuator 100 may include a drive mechanism (not visible in FIG. 1 or 2) configured to selectively drive the output shaft 102. The drive mechanism of HVAC actuator 100 may be housed entirely or in part within a housing 106. Housing 106 may have a front side (e.g., the side toward the top of FIG. 2) that faces away from the duct 30 and damper components, and a back side (e.g., the side toward the bottom of FIG. 2) that faces toward the duct and damper components when the HVAC actuator is operatively coupled to the duct and damper components. In some instances, the back wall of the housing 106 may be held away from the outer wall of the duct wall by a gap by virtue of the output shaft 102 extending out from the back side of the housing 106 and being mounted to the end of the damper shaft 54 as shown.

When output shaft 102 of HVAC actuator 100 rotates relative to housing 106, it may rotate damper shaft 54 and in turn damper blade 52 relative to duct 30, provided that the housing 106 does not move relative to the duct. To help prevent such movement, an anti-rotation rod 108 may be attached to housing 106, and the rod 108 may be inserted into a hole in the duct wall of duct 30. This is one implementation, and it is contemplated that any suitable anti-rotation mechanisms may be used, as desired. Anti-rotation rod 108 may be referred to as a stop. As illustrated, the back wall of the housing 106 may be configured to be spaced from the outer surface of the duct 30, and the anti-rotation rod or stop 108 may be configured to extend out away from the back wall of the housing 106 towards the duct to engage the duct wall when the HVAC actuator 100 is coupled to the damper components.

HVAC actuators of the present disclosure may include further features to ease their installation and maintenance. HVAC ducts are often insulated to retard heat loss and/or gain to/from the environment. Insulation may take the form of an insulating layer around the outer surface 32 of the duct. Referring back to FIG. 2, an outer surface 34 of an insulating layer 36 around duct 30 is represented in phantom outline. Where HVAC actuator 100 is disposed when coupled to the duct 30 and damper components, there may be a discontinuity in the insulating layer 36. To reduce insulative losses at the HVAC actuator 100, technicians may apply tape between the insulating layer 36 and the HVAC actuator 100. To facilitate such taping, HVAC actuator 100 may include a taping flange 210. Taping flange 210 may be configured to extend transversely away from the housing 106 and provide a taping surface 212 facing away from the duct 30. The taping flange 210 may further be configured to be spaced from the outer surface 32 of the duct 30 and adjacent to the outer surface 34 of the insulating layer 36 of the duct when the HVAC actuator 100 is coupled to the damper components. In some other illustrative examples, an HVAC actuator is coupled to a valve, which may be disposed in a pipe or other fluid handling enclosure to which insulation may applied similarly as with duct 30 of FIG. 2.

Taping flange 210 may be configured to facilitate taping of the HVAC actuator 100 to the outer surface 34 of the insulating layer 36. The taping flange 210 may be shaped to provide a front-facing surface 212 that is suitable for receiving tape to provide a seal between the taping flange 210 and the outer surface 34 of the insulating layer 36. The taping flange 210 may extend outward from the housing 106 around the entire perimeter of the housing, as illustrated. It may extend outward from the housing 106 by at least a minimum distance around the entire perimeter of the housing, for example, by at least 3 mm, 5 mm, 10 mm, or any other suitable distance. The taping flange 210 may extend outward from the housing 106 approximately perpendicular to adjacent side walls of the housing, but this is not required.

The taping flange 210 may be disposed relative to the other parts of the HVAC actuator at any suitable location. The front-facing surface 212 of the flange 210 may be disposed between the front side and back side of the housing 106. In some cases, the flange 210 may be disposed substantially in registration with the back side of the housing 106.

The taping flange 210 may be formed in any suitable way. The taping flange 210 may be formed integrally with the housing 106. In other illustrative embodiments, the taping flange 210 may be formed separately from the housing 106 and coupled to the housing.

The present disclosure contemplates a method for installing an HVAC actuator such as HVAC actuator 100 for driving an HVAC damper that is disposed in an insulated duct. The method may include the steps of operatively coupling an output shaft of the HVAC actuator to the input shaft of the HVAC damper and providing tape between a taping flange of the HVAC actuator and the outer surface of the insulating layer of the duct to form a seal. The method may further include the step of inserting a stop of the HVAC actuator through an aperture in the duct wall before operatively coupling the output shaft of the HVAC actuator to the input shaft of the HVAC damper. The method may also include tucking at least part of the insulating layer under the taping flange before providing tape between the taping flange of the HVAC actuator and the outer surface of the insulating layer of the duct to form a seal.

Figure 3:
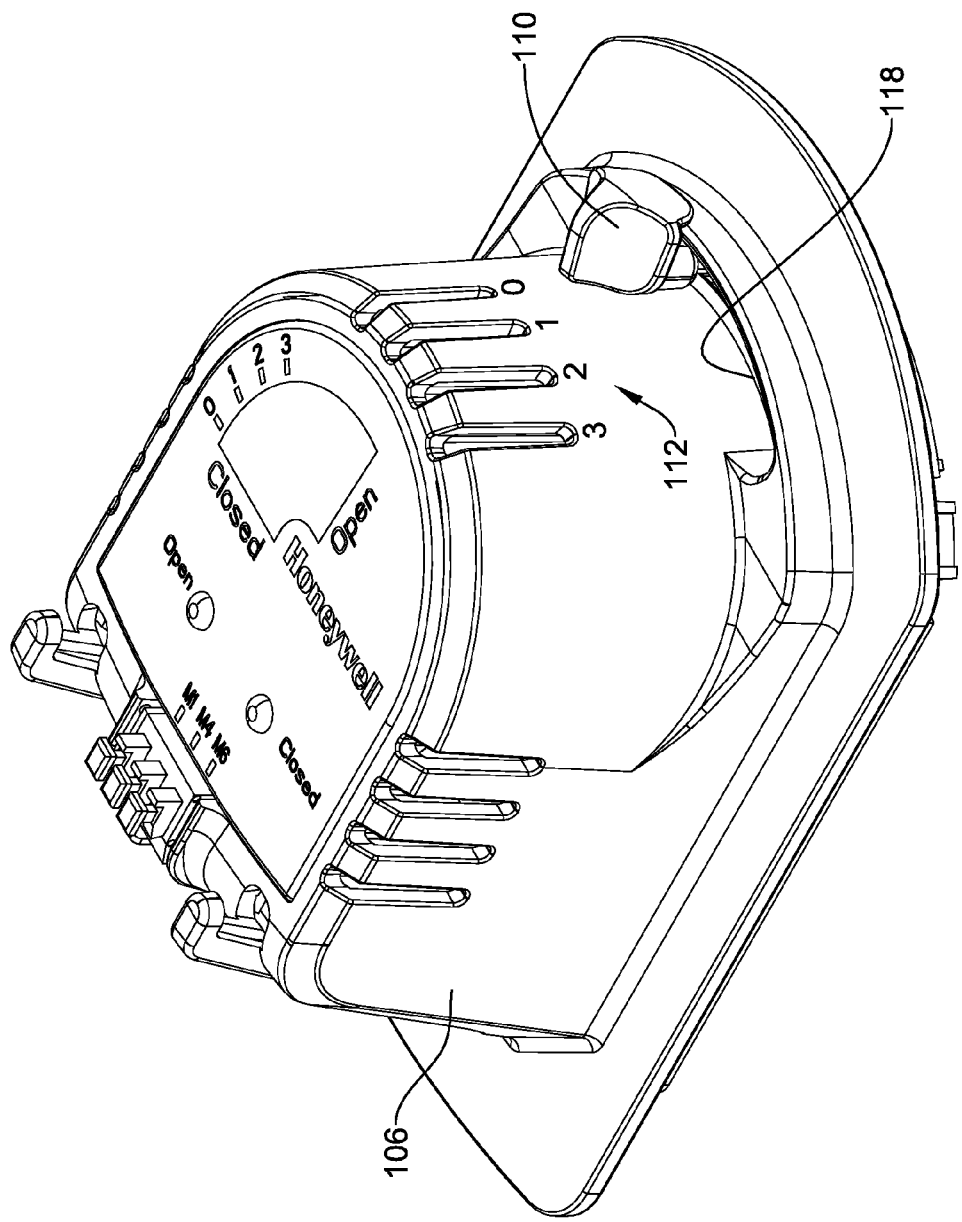
FIG. 3 is a schematic perspective view of a front side of the illustrative HVAC actuator of FIG. 1.
Figure 4:
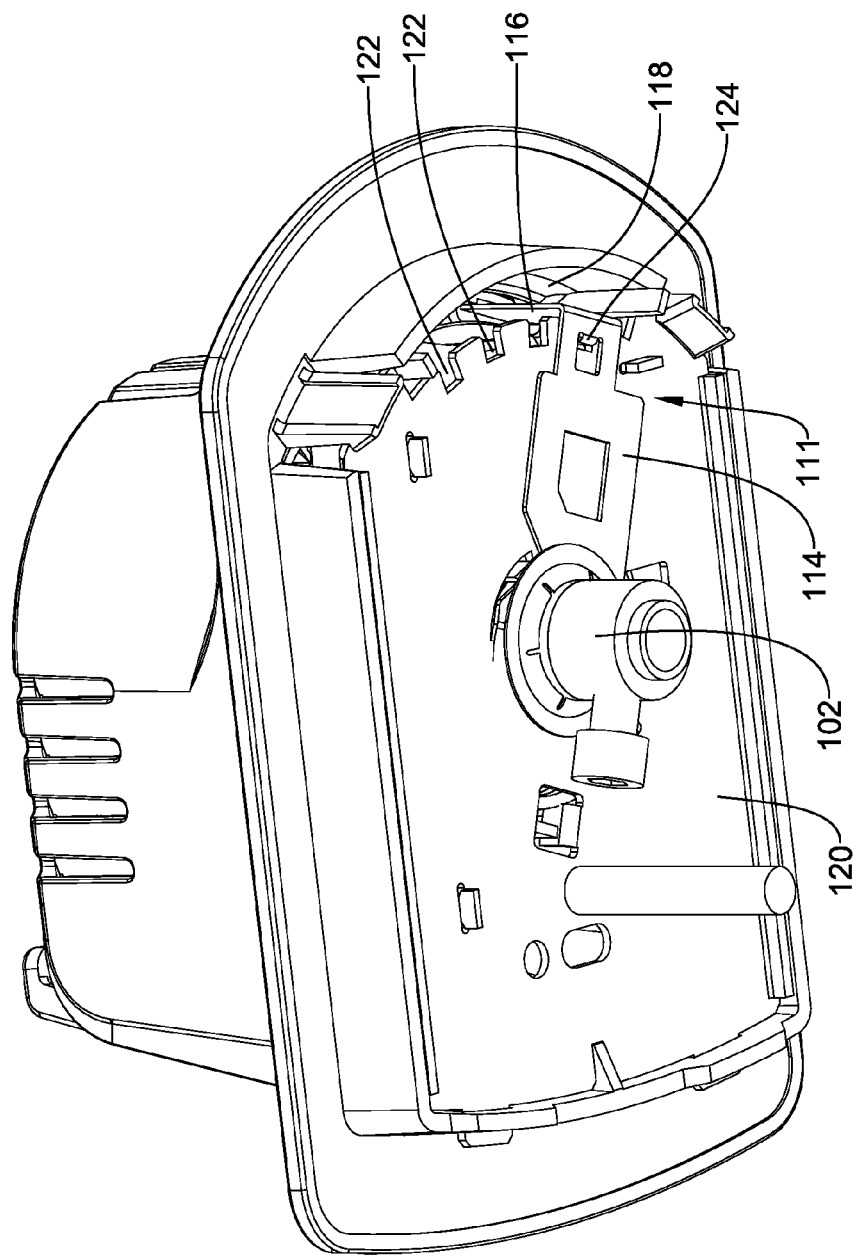
FIG. 4 is a schematic perspective view of a back side of the illustrative HVAC actuator of FIG. 1.
Figure 5:
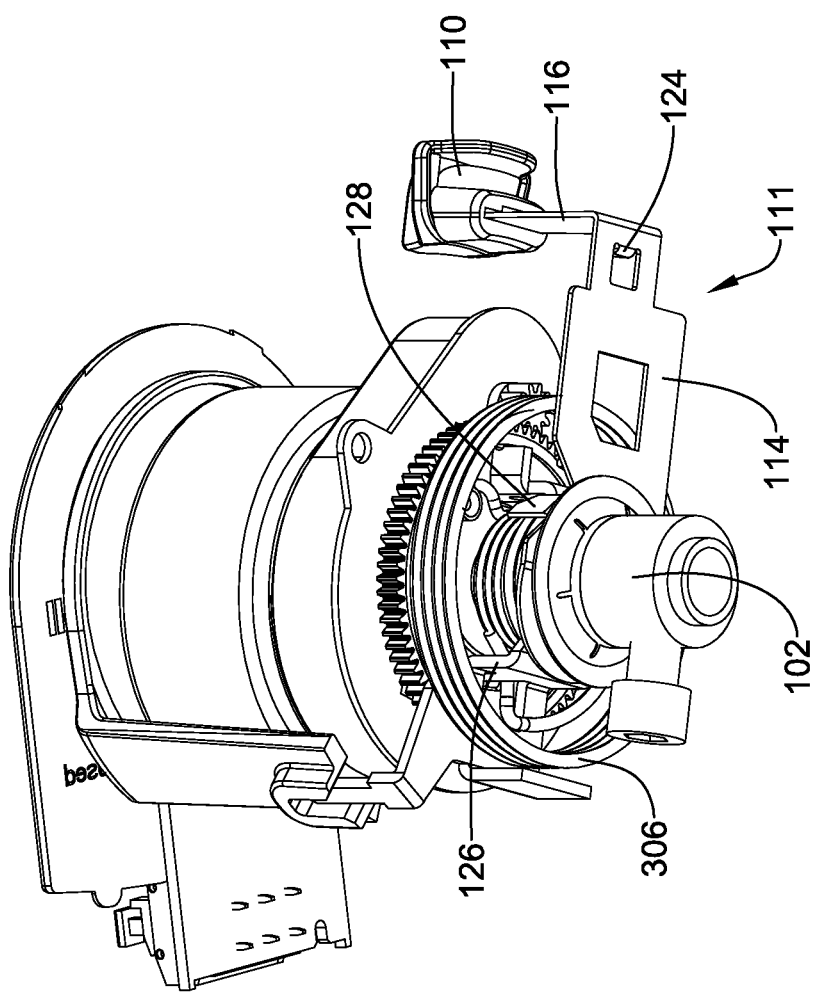
FIG. 5 is a schematic perspective view of illustrative HVAC actuator from the same viewpoint as FIG. 4, but with the housing and plate removed, showing further details of the range adjustment lever and the operation of the range adjustment mechanism.

As mentioned elsewhere herein, in some situations it may be desired to control the state of a damper to other than fully-open and/or fully-closed states. HVAC actuators of the present disclosure may be configured with a range adjustment mechanism to allow adjustment of their ranges of motion. For example, the illustrative damper system of FIG. 1 is illustrated with damper blade 52 and damper shaft 54 rotated to a fully closed position, with damper blade 52 in contact with damper stop 56. In a fully open position, damper blade 52 and damper shaft 54 may be rotated about 90 degrees clockwise, as viewed from the side of HVAC actuator 100, which we may refer to as the top side (relative to the drawing, but not necessarily describing a real-world spatial orientation of such a system). When fully open, the damper blade 52 and damper shaft 54 may be described (arbitrarily) as being disposed at 0 degrees, and when fully closed, at 90 degrees. Note that not all damper systems necessarily rotate through a range of 90 degrees between fully open and fully closed, and the description in the present disclosure of such a system should not be considered limiting. In applications where it may be desired to provide partially-closed states, an HVAC actuator may incorporate a range adjustment mechanism that prevent the actuator from rotating the damper blade 52 and damper shaft 54 (via output shaft 102) to the 90 degree fully closed position. FIGS. 3-5 illustrate aspects of an illustrative range adjustment mechanism. Similarly, in some illustrative examples, a range adjustment mechanism may be configured to prevent an actuator from rotating a damper blade and shaft to a 0 degree fully open position.

FIG. 3 is a schematic perspective view of a front side of the illustrative HVAC actuator 100 showing, among other features, a range adjustment knob 110. The range adjustment knob 110 is part of a range adjustment lever 111 more fully viewable in FIGS. 4, 5, and other Figures of this disclosure. In the example shown, range adjustment knob 110 is disposed on front side of housing 106, where it may be manipulated easily by a user after the HVAC actuator 100 is mounted to a damper shaft 54 to allow the user to selectively limit rotation of the output shaft to a reduced range that is a subset of the full range of motion of the output shaft. An indicator 112 on housing 106 may indicate, in conjunction with the position of range adjustment knob 110, the adjustment of the range that has been selected, if any. As illustrated, indicator 112 may include indicia labeled "0", "1", "2", and "3", although this is not limiting, and the indicator may include fewer or more indicia in some examples.

The indicia "0", "1", "2", and "3" may indicate discrete locations at which the range adjustment lever 111 and knob 110 may be set and adjusted between. Setting the range adjustment lever 111 and knob 110 to one of the discrete locations such as "0", "1", "2", and "3" may allow a user to select a predetermined reduced range of motion that is a subset of the full range of motion of the output shaft 102. Depending on the number of discrete locations provided, the range adjustment lever 111 may allow the user to select between no reduced range and a single predetermined reduced range, or a greater number of predetermined reduced ranges, such as two, three, or more. In the illustrative example of FIGS. 3-5, three predetermined reduced ranges ("1", "2", and "3") are provided. Indicator 112 may also be referred to as a range indicator, and/or indicia "0", "1", "2", and "3" may be referred to as range indicators, in that they may indicate, in conjunction with the range adjustment knob 110 of the range adjustment lever 111, which range or predetermined reduced range is selected.

Indicium "0" may indicate a no stop position or setting of the range adjustment mechanism, in which the output shaft 102 is not restricted from rotating around its full range of motion completely from first end position (e.g., fully closed, 90 degrees) to second end position (e.g., fully open, 0 degrees). Indicia "1", "2", and "3" may indicate positions or settings of the range adjustment mechanism in which the output shaft 102 is restricted from rotating around its full range of motion in progressively smaller reduced ranges. For example, when set to position "1", the range may be restricted between 80 degrees (10 degrees from fully closed) and 0 degrees (fully open), when set to position "2", the range may be restricted between 65 degrees and 0 degrees, and when set to position "3", the range may be restricted between 50 degrees and 0 degrees, although these values of 80, 65, and 50 degrees are merely exemplary and should not be considered limiting. In the example of this paragraph, the predetermined reduced ranges "1", "2", and "3" each includes the second end position (0 degrees) but has different first stop position (80, 65, and 50 degrees), the different first stop positions corresponding to partially-closed damper states. In other illustrative examples, predetermined reduced ranges may have a common first end position but different second stop positions. In some instances, and while not explicitly shown in FIG. 3, there may be two adjustment levers provided; one for controlling one end (e.g. more closed end) of the desired range of motion and another for controlling the other end (e.g. more open end) of the desired range.

FIG. 4 is a schematic perspective view of illustrative HVAC actuator 100 showing features visible on the back side of the actuator, including the range adjustment lever 111. The range adjustment lever 111 may be rotatably mounted concentric with the output shaft 102 of the HVAC actuator 100. The range adjustment lever 111 may have a first portion 114 extending radially outward relative to the output shaft 102 and a second portion 116 that extend from the first portion toward the front side of the housing 106. The range adjustment knob 110 may be considered to be a part of the second portion 116, or it may be considered to be attached to the second portion. The housing 106 may include an opening 118 through which the second portion 116 extends from the back side to the front side of the housing 106, although this is not necessary. In some illustrative examples, a range adjustment lever may extend from back to front around the outside of the housing. In some illustrative examples, a range adjustment lever may not extend from the back to the front of an actuator entirely, or at all. In some such cases the range adjustment lever may be manipulatable from the front side of the housing, for example, by extending a tool or a finger through an opening in the housing to reach the range adjustment lever for adjustment.

As shown, the illustrative HVAC actuator 100 includes a plate 120 that is generally perpendicular to the output shaft 102 and proximal the first portion 114 of the range adjustment lever 111. The plate 120 may be rigidly affixed relative to the housing 106. The plate 120 may form at least part of a back surface of the housing 106 of the HVAC actuator 100, but this is not required. In some illustrative examples, the plate 120 may be disposed at an intermediate depth within the interior of the HVAC actuator housing. In the example shown, plate 120 may include two or more receptacles 122, and the range adjustment lever 111 may include a projection 124 engageable by any one of the two or more receptacles. The projection 124 may be included as part of the first portion 114 of the range adjustment lever 111, but this is not necessary. In some illustrative examples, a projection may be provided as part of a second portion of a range adjustment lever 111, or be configured with respect to the range adjustment lever in any other suitable manner. When the projection 124 is engaged by any one of the two or more receptacles 122, their engagement may substantially prevent rotation of the range adjustment lever 111 relative to the plate 120 and thus the housing 106, which in effect "locks" the range adjustment lever to a lock position defined by a receptacle.

The range adjustment lever 111 may be manipulatable from the front side of the housing 106 to disengage the projection 124 from any one of the two or more receptacles 122, to rotate the range adjustment lever, and to engage the projection with another one of the two or more receptacles, thereby allowing adjustment of the rotational position of the range adjustment lever between two or more discrete locations. The range adjustment lever 111 may include or incorporate a spring lever, for example, the first portion 114 of the range adjustment lever may comprise a suitably elastic material, such an appropriate metal of suitable thickness. The "springy" or resilient range adjustment lever 111 may be configured such that when a force is applied to the range adjustment lever toward the back of the housing 106 (e.g., via pressing range adjustment knob 110 toward the back), the projection 124 of the range adjustment lever may disengage from any one of the two or more receptacles 122 of the plate 120, releasing the range adjustment lever for rotation to a new position. Alternatively, in some illustrative examples, the relationship between a range adjustment lever and plate may be somewhat different, such that force is applied to the range adjustment lever toward the front of the housing to disengage a projection from a receptacle to release the range adjustment lever for rotation to a new position.

In another example, it is contemplated that the range adjustment lever 111 may be configured to be pushed in a direction radially away from the output shaft 102 to disengage the projection from the two or more receptacles, after which the range adjustment lever 11 may be rotated to align the projection with a newly selected one of the two or more receptacles. The range adjustment lever 111 may then be pushed radially toward the output shaft 102 to engage the projection with the newly selected receptacle. In yet another example, it is contemplated that the range adjustment lever 111 may be configured to be pushed in a direction radially toward the output shaft 102 to disengage the projection from the two or more receptacles, after which the range adjustment lever 11 may be rotated to align the projection with a newly selected one of the two or more receptacles. The range adjustment lever 111 may then be pushed radially away from output shaft 102 to engage the projection with the newly selected receptacle.

FIG. 5 is a schematic perspective view of illustrative HVAC actuator 100 from the same viewpoint as FIG. 4, but with the housing 106 and plate 120 removed, showing further details of the range adjustment lever 111 and the operation of the range adjustment mechanism. The illustrative HVAC actuator 100 may include a tab 126 rigidly connected to the output shaft 102, and the range adjustment lever 111 may move a mechanical stop 128 configured to limit the rotation of the output shaft when the tab 126 is rotated into contact with the mechanical stop 128. The mechanical stop 128 may be integral to the range adjustment lever 111, but this is not required. When the mechanical stop 128 is integral to the range adjustment lever 111, then it may be substantially fixed or "locked" relative to the housing 106 of the HVAC actuator 100 when the projection 124 of the range adjustment lever 111 is engaged by a receptacle 122 of the plate 120.

As described herein, the range adjustment lever 111 may allow a user to select any provided stop position (for example, corresponding to discrete locations of the range adjustment lever that correspond to receptacles 122, which may also correspond to indicated positions "1", "2", and "3") or a no stop position (for example, corresponding to a receptacle of the plate 120 that corresponds to indicated position "0") of the output shaft 102, where the stop positions prevent the output shaft 102 from rotating completely to the first end position, and the no stop position allows the output shaft to rotate completely to the first end position. Indicator 112 may visually indicate which stop position if any has been selected.

While an HVAC actuator having a single range adjustment lever 111 is illustrated, it is contemplated that a second range adjustment lever (not shown) may also be provided, such that both first and second stops in either direction of motion for an HVAC actuator may be provided. That is, in some embodiments, there may be two adjustment levers provided; one for controlling one end (e.g. more closed end) of the desired range of motion and another for controlling the other end (e.g. more open end) of the desired range.

The present disclosure contemplates a method for adjusting a range of motion of an HVAC actuator such as HVAC actuator 100. The method may include the steps of manipulating an adjustment lever from the front side of the housing to unlock the adjustment lever from a first lock position, moving the adjustment lever along a path to a second lock position, and releasing the adjustment lever to lock the adjustment lever in the second lock position. At least one of the first lock position and the second lock position may establish a stop position that limits rotation of the output shaft from reaching an end position of a full range of rotation motion between a first end position and a second end position. As described further detail herein, manipulating the adjustment lever may include pressing the lever in a direction that is toward the back side of the HVAC actuator, but other mechanisms are also contemplated.

Figure 6:
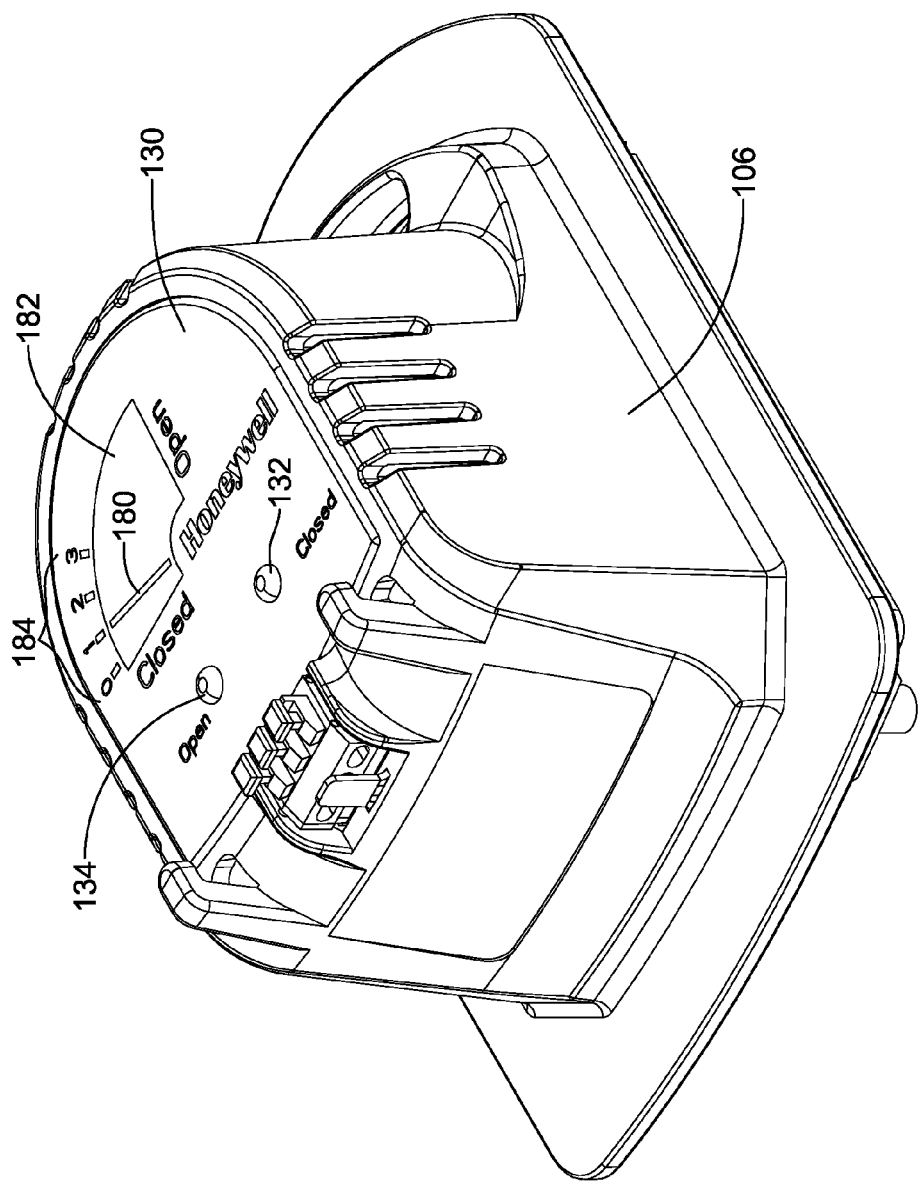
FIG. 6 is a schematic perspective view of the illustrative HVAC actuator of FIG. 1 showing a faceplate on the front side.

The position of range adjustment knob 110 relative to indicator 112 may afford a technician the ability to easily visually assess the current setting of the range adjustment mechanism of the HVAC actuator 100. HVAC actuator 10 may include other features that allow easy visual assessment of the state of the actuator. FIG. 6 is a schematic perspective view of illustrative HVAC actuator 100 showing, among other features, a faceplate 130 on the front side of the actuator that may display useful information. Faceplate 130 may include a first window 132 and a second window 134 positioned to provide visibility to an observer external the housing of light from corresponding light sources disposed within the housing. The first window 132 may be a component of a "closed" indicator and the second window 134 may be a component of an "open" indicator, but this is not limiting and other configurations may be used in other examples. Windows 132, 134 may include lenses, diffractive or diffusive patterning, or any other suitable light redirection features that may help disperse or otherwise increase the viewing angle of the windows to an observer external the housing, when viewing light from light sources within the housing. Faceplate 130 may be considered to be a component of the housing 106.

To indicate the current operation of the HVAC actuator 100 to the technician, first light may have a first color (which may be red, for example, although this is arbitrary and any desired color may be chosen), and may be visible in first window 132 when the actuator is being actuated toward the first end position. First light may appear to blink (e.g., varying significantly in intensity versus time) in first window 132 when the output shaft 102 is rotating toward the first end position, and in some cases, may remain continuously visible with substantially constant intensity when the output shaft is disposed at the first end position or a first stop position, which may correspond to a damper closed state or damper partial closed state. If, on the other hand, the actuator is being actuated toward the second end position, the second light having a second color (which may be green, for example) may be visible in second window 134. Second light may appear to blink in second window 134 when the output shaft 102 is rotating toward the second end position, and in some instances, may remain continuously visible with essentially constant intensity when the output shaft 102 is disposed at the second end position or a second stop position, which may correspond to a damper open state or damper partial open state. In some cases, HVAC actuator may be configured such that at most one of first window 132 and second window 134 transmits first or second light, respectively, at any given time.

Costs associated with implementing the light indication patterns described herein may be reduced by adopting what may be described as a mechanical shutter or mechanical aperture approach to modulating the light visible through the first window 132 and/or the second window 134, when compared to other approaches potentially involving switches, wiring, electronic logic, and the like. FIGS. 6-13 illustrate such an approach.

Figure 7:
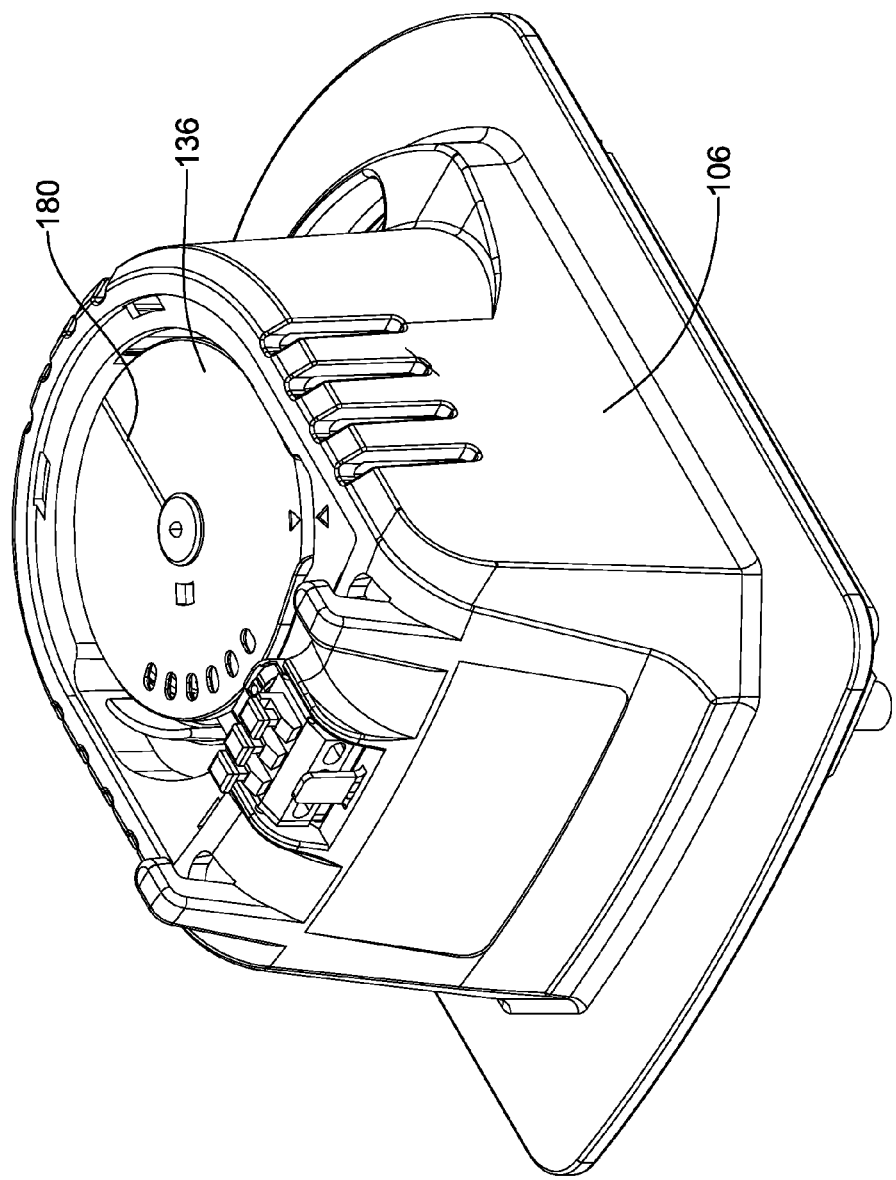
FIG. 7 is a schematic perspective view of the illustrative HVAC actuator of FIG. 6 with the faceplate removed.
Figure 8:
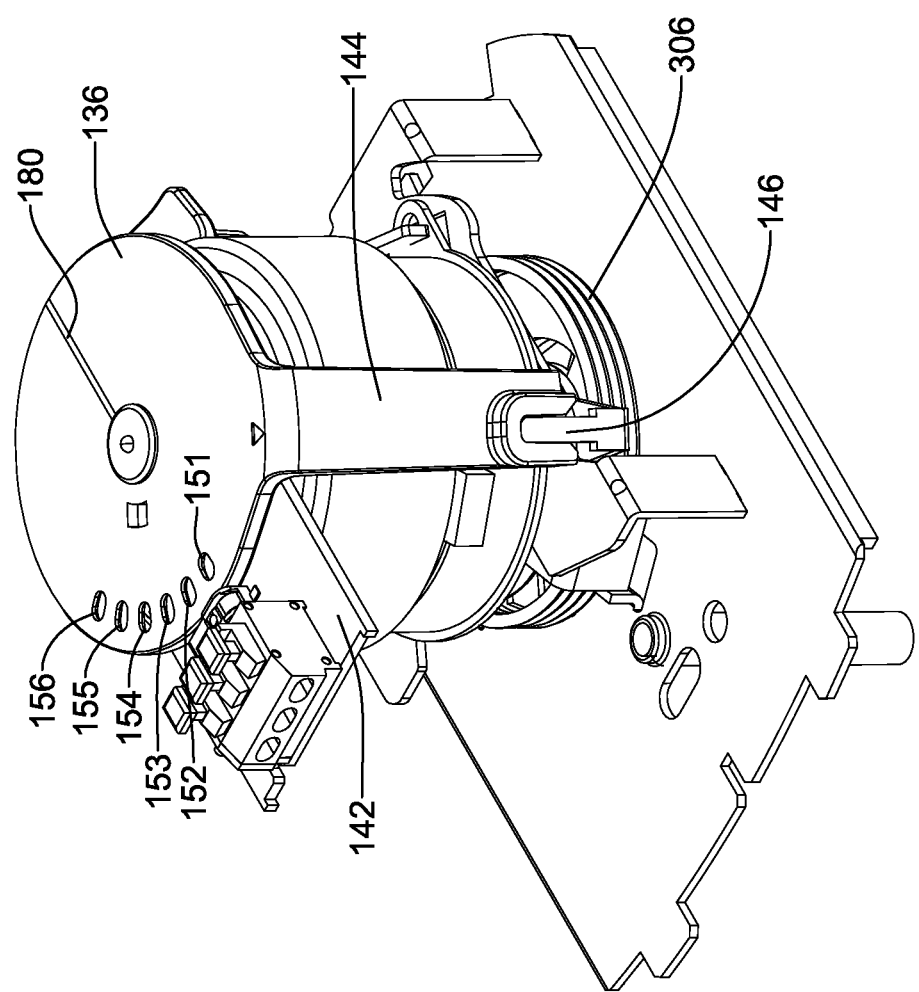
FIG. 8 is a schematic perspective view of the illustrative HVAC actuator of FIG. 7 with the housing also removed.

FIG. 7 is a schematic perspective view of illustrative HVAC actuator 100 of FIG. 6, but with the faceplate 130 removed. FIG. 8 is a schematic perspective view of illustrative HVAC actuator 100 of FIG. 7 with the housing 106 also removed. An aperture member or wheel 136 is shown in FIGS. 7 and 8, but is removed in the schematic perspective view of FIG. 9. In FIG. 9, a first light source 138 and a second light source 140 are shown disposed on circuit board 142. First light source 138 and second light source 140 may be configured to provide first light having a first color and second light having a second color, respectively. Light sources 138, 140 may be light emitting diodes (LEDs), but this is not required and may be any suitable light source as desired. As may be appreciated from examination of FIGS. 6 through 11A, first window 132 may be aligned and positioned to provide visibility of the first light from the first light source 138 to an observer external the housing 106, and second window 134 may be aligned and positioned to provide visibility of the second light from the second light source 140 to the observer. First light and second light may be visible via first and second windows 132, 134 if there is no obstruction between first and second light sources 138, 140 and their respective first and second windows 132, 134. Aperture member/wheel 136 may be situated between the light sources 138, 140 and the windows 132, 134 and may, depending on its spatial disposition, obstruct or not obstruct the light from reaching the windows 132, 134. Aperture member/wheel 136 may have a plurality of spaced openings 151, 152, 153, 154, 155, and 156 through which light may pass unobstructed. Between the spaced openings 151-156, the aperture member/wheel 136 may be substantially opaque and obstruct the passage of light, although it is not necessary for the passage of light to be obstructed completely. In some illustrative examples, solid portions of the aperture wheel may partially obstruct and partially transmit light. In other illustrative examples, solid portions of the aperture wheel may completely obstruct light.

In some instances, aperture member/wheel 136 may be operatively coupled to the output shaft 102 of HVAC actuator 100 in any suitable way, directly or indirectly. Being so coupled, aperture member/wheel 136 may rotate as the output shaft is rotated. In some illustrative examples, aperture member/wheel 136 may be coupled indirectly to the output shaft 102 through one or more gears, and rotate in accordance with a gearing ratio with respect to the rotation of the output shaft. In the illustrative example of HVAC actuator 100, aperture member/wheel 136 may be directly coupled relative to the output shaft 102 and may rotate at the same rotational rate as the output shaft 102. Aperture member/wheel 136 may be coupled to or integrally formed with an arm 144, as best seen in FIG. 8. Arm 144 may in turn be coupled to output shaft 102. Such coupling may be via a coupling member 146, which may be rigidly coupled to the output shaft 102. The arrangement of output shaft 102, coupling member 146, and arm 144 illustrated in FIG. 8 may provide a mechanism to transfer rotational motion directly from the output shaft 102 disposed generally at the back side of the HVAC actuator 100 to the aperture member/wheel 136 at the front side of the actuator. Aperture/member wheel 136 may be round in shape, although this is not necessary. Aperture/member wheel 136 may rotate about a common rotation axis as the output shaft 102, although this is not necessary.

FIGS. 10A-E are schematic perspective views from the front side of HVAC actuator 100 of faceplate 130 (rendered in phantom) with first window 132 and second window 134, aperture member/wheel 136, and circuit board 142 with first light source 138 and second light source 140, with other components of the actuator omitted for clarity. FIGS. 10A-E all show the same components of HVAC actuator 100, but with aperture member/wheel 136 disposed at different rotational positions as it rotates with output shaft 102. At various rotational positions, there generally may be different alignments between aperture member/wheel 136 (and more particularly, the openings 151-156 of the aperture wheel) and the light sources 138, 140, as well as windows 132, 134, as described in the following paragraphs.

In FIG. 10A, HVAC actuator 100 may be disposed in a damper fully open state, with output shaft 102 rotated fully to the second end position. Opening 153 of the aperture member/wheel 136 is aligned and in registration with second light source 140 such that if the second light source is illuminated, its light is visible through second window 134. Second light source 140 may be illuminated when HVAC actuator 100 is electrically commanded to open, as discussed further elsewhere herein. Note that first light source 138 is not visible through any of openings 151-156, as none of the openings are in registration with the first light source. In other illustrative examples, there may be an opening in registration with the first light source 138 when the output shaft 102 is rotated fully to the second end position.

Figure 10E:
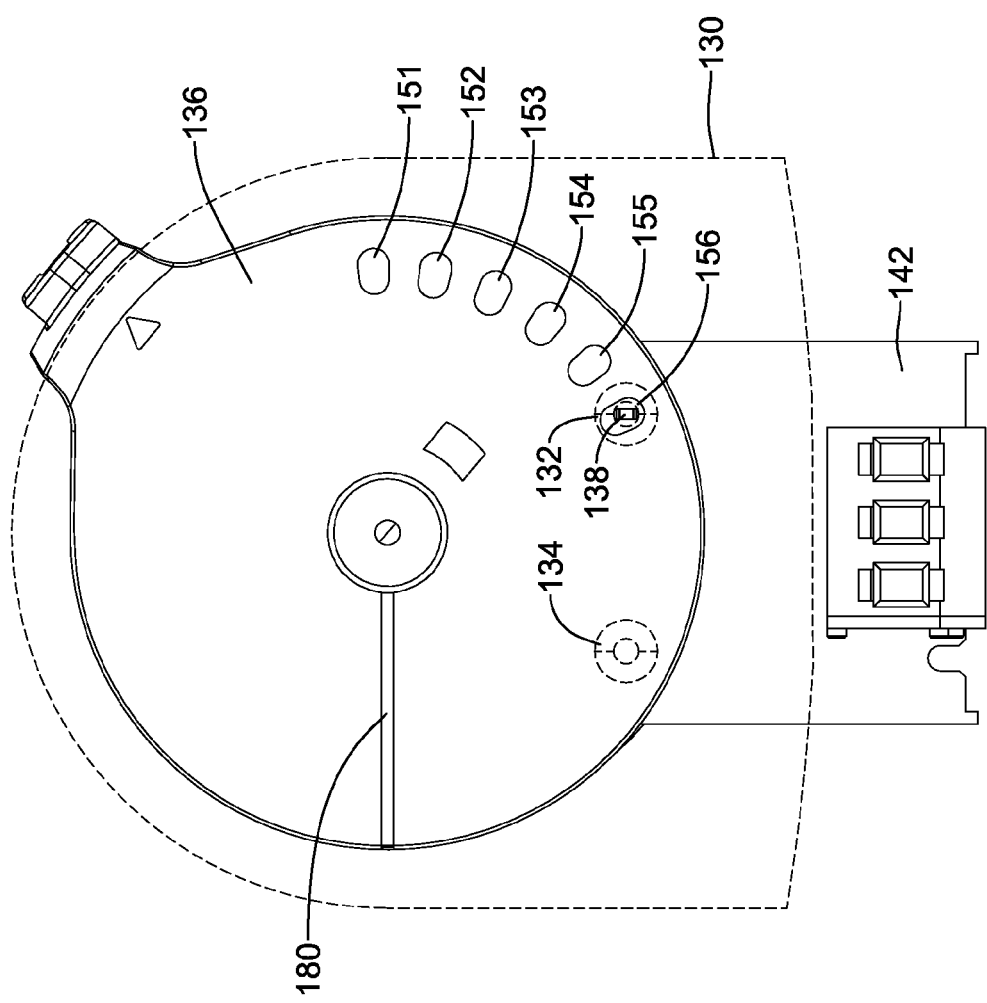
Figure 11A:
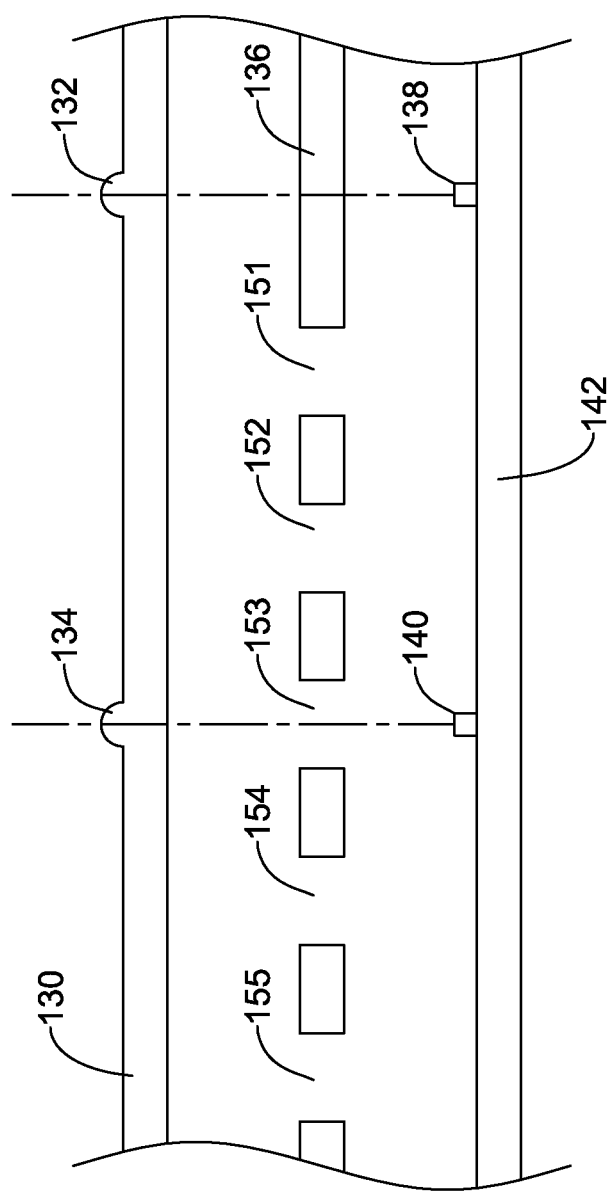
FIG. 11A is a schematic cross sectional side view of an illustrative faceplate, aperture member/wheel, and circuit board having a first light source and a second light source.

FIG. 11A is a schematic cross sectional view of faceplate 130 with first window 132 and second window 134, aperture member/wheel 136, and circuit board 142 with first light source 138 and second light source 140, with other components of the actuator omitted for clarity. The relative alignment of windows 132, 134, aperture member/wheel 136, and light sources 138, 140 is substantially the same as that illustrated in FIG. 10A. In this view, one may appreciate the alignment and registration of opening 153 relative to second light source 140 such that if the second light source is illuminated, its light is visible through second window 134. Also as in FIG. 10A, none of the openings 151-156 of aperture member/wheel 136 are registered with the first light source 138, such that the aperture wheel 136 obstructs the path of light from the first light source 138 to the first window 132.

In FIG. 10B, the output shaft 102 and the aperture member/wheel 136 are rotated counter-clockwise relative to FIG. 10A. Opening 151 of the aperture member/wheel 136 is aligned and in registration with first light source 138 such that if the first light source is illuminated, its light is visible through first window 132. FIG. 10B could illustrate an instant in time as HVAC actuator 100 is in the process of rotating the output shaft toward a closed or partially-closed state, having started, for example, in the open state illustrated in FIG. 10A. When HVAC actuator 100 is electrically commanded to close, first light source 138 may be illuminated continuously, as discussed further elsewhere herein. However, light from first light source 138 may only be visible through first window 132 to an observer when an opening of the aperture member/wheel 136 is aligned with the light source 138, as is opening 151 in FIG. 10B. In the example of an HVAC actuator 100 commanded to close from an open state (as in FIG. 10A), the state illustrated in FIG. 10B may be the first time light from illuminated first light source 138 may be visible to an observer, having appeared to have blinked on as opening 151 rotated into alignment with the first light source 138, despite the fact that first light source 138 may have been illuminated continuously from the earliest moment that the actuator was commanded to close, when solid portions of aperture member/wheel 136 may have obstructed light from the first light source 138 from reaching the first window 132.

In FIG. 10C, the output shaft 102 and the aperture member/wheel 136 are rotated further counter-clockwise relative to FIG. 10B. First light source 138 is not visible, with an obstructing portion of aperture member/wheel 136 between openings 151 and 152 being positioned over the light source. None of openings 151-6 are aligned and in registration with first light source 138. Continuing the example of an HVAC actuator 100 being commanded to close, an observer may have perceived light from illuminated first light source 138 to have blinked off as the obstructing portion between openings 151 and 152 rotated into the position of FIG. 10C from the previous position of FIG. 10B. Even though the first light source 138 may have remained illuminated during the rotation of output shaft 102 and aperture member/wheel 136, the effective appearance from outside the housing 106 of the HVAC actuator may be that the first light is turning on and off (blinking) as openings and obstructions of the aperture wheel 136 alternate in passing between the first light source 138 and the first window 132. Some or all openings 151-156 may be configured to cause the appearance of blinking of the first light from first light source 138 through the first window 132 as the output shaft 012 is rotated toward the first end position.

In FIG. 10D, the output shaft 102 and the aperture member/wheel 136 are rotated further counter-clockwise relative to FIG. 10C. Opening 154 is aligned and in registration with first light source 138 such that if the first light source 138 is illuminated, its light is visible through first window 132. The position of aperture member/wheel 136 may correspond to a damper partially-closed stop position selected via the range adjustment mechanism of HVAC actuator 100, for example, range stop position "2". In an example where the range stop position "2" has been selected, first light from first light source 138 may remain continuously visible through opening 154 and first window 132 if the first light source 138 remains illuminated, as may be the case when the HVAC actuator is being commanded to be closed. Similarly as in the state illustrated in FIG. 10D, openings 153 and 155 may correspond to range stop position "3" and "1" respectively such that they may be aligned and in registration with first light source 138 when the output shaft 102 is stopped at one of those positions.

In FIG. 10E, the output shaft 102 and the aperture member/wheel 136 are rotated further counter-clockwise relative to FIG. 10D. Opening 156 is aligned and in registration with first light source 138 such that if the first light source 138 is illuminated, its light is visible through first window 132. The position of aperture member/wheel 136 may correspond to an actuator state with the output shaft 102 rotated completely to the first end position, which may correspond to a damper fully closed state. If HVAC actuator 100 continues in a state of being electrically commanded to close, as discussed further elsewhere herein, first light source 138 may remain illuminated and its light may remain continuously visible through first window 132 for as long as it continues in that state.

With the output shaft stopped at any of range stop positions "1", "2" (such as in FIG. 10D), or "3", or no stop position "0" (such as in FIG. 10E), second light source 140 may remain obscured by aperture member/wheel 136, with none of the openings 151-156 aligned and in registration with the second light source 140. In other illustrative examples, there may be aperture member openings aligned with the second light source 140 when the output shaft is stopped at a first stop or end position.

The discussion of FIGS. 10A-10E may generally describe a progression starting at FIG. 10A with output shaft 102 rotated fully to the second end position which may correspond to a damper fully open state, and progressing to FIG. 10E, with the output shaft 102 rotated fully to the first end position which may correspond to a damper fully closed state. In the progression of FIGS. 10B-10E, which may depict the aperture member/wheel 136 rotating counter-clockwise as the output shaft 102 rotates counter-clockwise toward the first end of the rotation range, first light source 138 may be continuously illuminated, with the alternating pattern of openings and obstructions of the aperture wheel 136 helping to create the appearance of blinking of first light as viewed via first window 132. The aperture member/wheel 136 may likewise modulate second light from second light source 140, when the second light source is illuminated. The second light source 140 may be illuminated when HVAC actuator 100 is electrically commanded to rotate the output shaft 102 toward the second end of its range, which may correspond to a damper open state. In such a condition, the second light source 140 may be illuminated continuously whether the output shaft 102 is rotating toward the second end of its range, or whether it stationary at the second end of its range. As may be appreciated from FIG. 10A, where opening 153 is aligned and in registration with second light source 140, and openings 154, 155, and 156 are disposed clockwise relative to the second light source 140, openings 153-156 may participate in providing varying patterns of second light.

It is contemplated that any appropriate patterns of openings, including variations in the quantity of openings, may be provided on an aperture member to results in light patterns similar to those described herein. Other arrangements are contemplated. In some illustrative examples, light sources may be disposed at different radii relative to the axis of rotation of the aperture member/wheel 136, and separate patterns of openings at corresponding radii may exclusively modulate the light output of the different light sources. Also, the openings need not be defined on all sides by the aperture member. For example, in some cases, the perimeter of the aperture member may undulate inwardly at certain locations to form corresponding openings.

Other configurations for indicator lights in HVAC actuators are contemplated. FIG. 12 is a schematic illustration of a faceplate 160 of an HVAC actuator similar to HVAC actuator 100. Faceplate 160 has a single indicator window 162. An HVAC actuator having faceplate 160 with single indicator window 162 may be configured with a light source corresponding to the single indicator window and a moving aperture member that modulates visibility of light from the light source via the single indicator window in a manner like or similar to that of the system of FIGS. 6-11A. Such an HVAC actuator may be configured such that the light source only illuminates when the actuator is powered to drive its output shaft in one direction (for example, in a damper open direction), but not when the actuator moves the output shaft in the other direction (for example, the closed direction). As described elsewhere herein, such an HVAC actuator may be powered only to drive its output shaft in the one direction, and may move the output shaft in the other direction when unpowered, for example, through the action of a return spring. In some instances, an HVAC actuator having faceplate 160 of FIG. 12 may be a damper actuator for a venting or bypass applications.

Figure 11B:
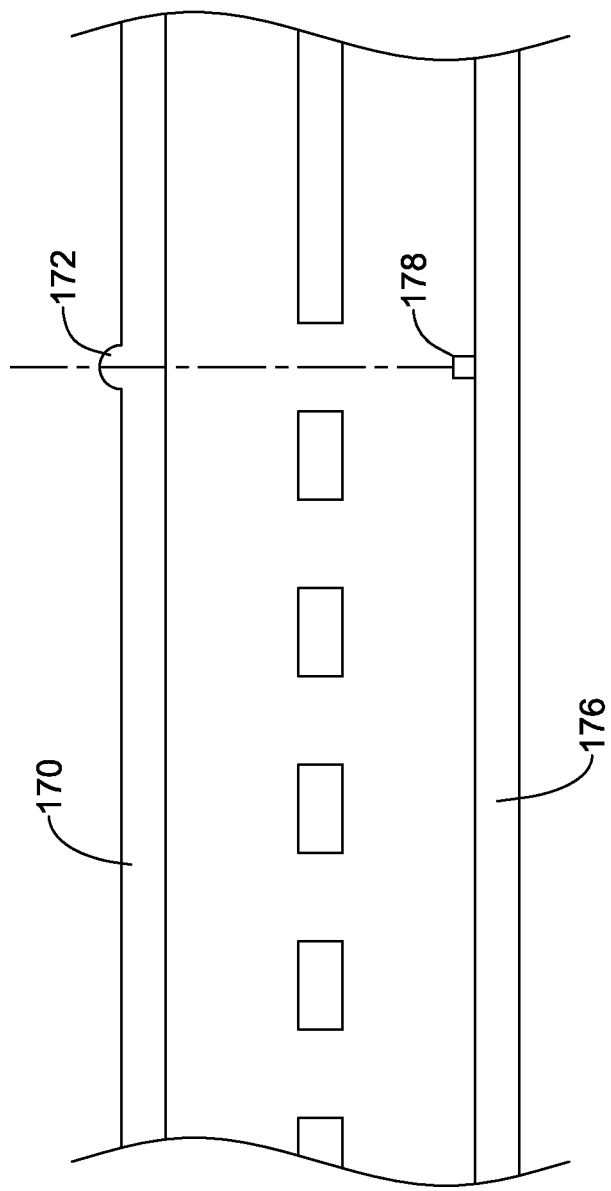
FIG. 11B is a schematic cross sectional view of another illustrative faceplate, aperture member/wheel, and circuit board having a first light source.
Figure 12:
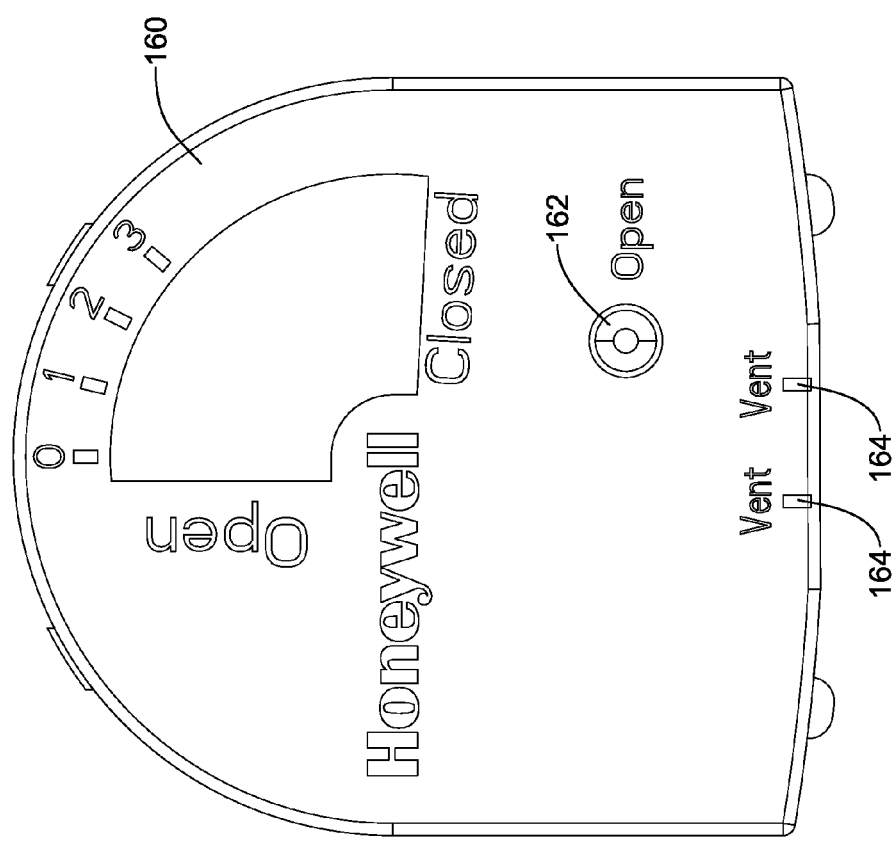
FIG. 12 is a schematic illustration of a faceplate of another illustrative HVAC actuator similar to the HVAC actuator of FIG. 1.

FIG. 11B is a schematic cross sectional view of an actuator faceplate 170 with an indicator window 172, an aperture member 174, and circuit board 176 with light source 178. In an illustrative example, the arrangement of FIG. 11B may be similar to that of FIG. 11A, but with only a single window and light source rather than two. In another illustrative example, the arrangement of FIG. 11B may correspond to or be compatible with faceplate 160 of FIG. 12. The arrangement of FIG. 11B may correspond to still yet another example, in which light source 178 may be capable of emitting multiple colors of light independently. This may be accomplished with multiple LED emitters, but it is contemplated that any suitable technology may be used. Such an arrangement could be operated with a first color emitted when the actuator is actuated in a first direction, and a second color when actuated in a second direction. The same openings in aperture member 174 may modulate the transmission of either color of light.

Figure 13:
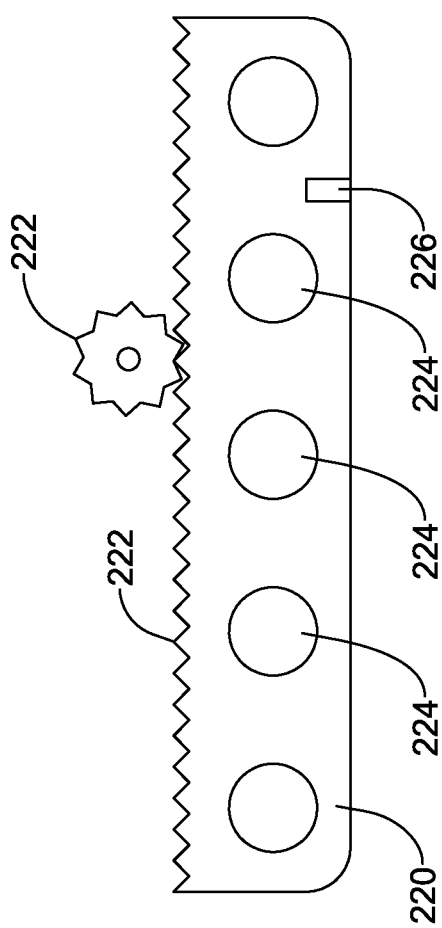
FIG. 13 is a schematic illustration of another illustrative example of an aperture member.

FIG. 13 is a schematic illustration of another illustrative example of an aperture member 220 that may be configured to modulate light for an HVAC actuator in a manner similar to aperture member/wheel 136. Aperture member 220 may translate as the output shaft of the HVAC actuator of which it is a component is rotated. Aperture member 220 may be linked to output shaft motion via a rack-and-pinion mechanism 222. Openings 224 may provide a like function as openings 151-156 of aperture member/wheel 136. While a rack-and-pinion mechanism is shown in FIG. 13 to produce a linear motion for the aperture member 220, it is contemplated that any suitable translation mechanism may be used to move a number of apertures relative to one or more light sources.

The present disclosure contemplates a method for operating an HVAC actuator having the indicator features described in connection with FIGS. 6-12. The method may include the steps of rotating an output shaft toward a first end position and stopping rotation of the output shaft when the output shaft reaches the first end position. The method may also include the step, as the output shaft 102 is rotated toward the first end position, of moving an aperture member 136. The aperture member 136 may have two or more spaced openings that transmit a first light from a first light source 138 to a first window 132 of a housing at each of two or more positions of the output shaft 102, where the two or more openings of the aperture member 136 are configured to cause the appearance of blinking of the first light through the first window 132 as the output shaft 102 is rotated toward the first end position, and remaining lit when the output shaft 102 is at the first end position. The method may further include the steps of rotating the output shaft 102 toward a second end position and stopping rotation of the output shaft 102 when the output shaft reaches the second end position. The method may also include the step, as the output shaft 102 is rotated toward the second end position, of moving the aperture member 136. The two or more spaced openings of the aperture member 136 may be configured to transmit a second light from a second light source 140 to a second window 134 of the housing at each of two or more positions of the output shaft 102, where the two or more openings of the aperture member 136 are configured to cause the appearance of blinking of the second light through the second window 134 as the output shaft 102 is rotated toward the second end position and remaining lit when the output shaft 102 is at the second end position The illuminated indicators provided via first and second windows 132, 134 may allow a technician a convenient visual information display of whether HVAC actuator 100 is being supplied power to be driven or to move in the first or the second direction, and may allow the technician to quickly perceive whether the actuator is actually rotating its output shaft 102, via blinking modulated by the moving aperture member/wheel 136. HVAC actuator 100 may provide further visual indicators of its current status. HVAC actuator 100 may include a position indicator viewable from the front side of housing 106 that moves as the output shaft 102 is rotated such that the position indicator indicates a current position of the output shaft. Aperture member/wheel 136, which is operatively coupled to the output shaft 102 of HVAC actuator 100 and rotates with the output shaft, may serve as an indicator wheel for the position indicator. However, it is not required that aperture member/wheel 136 also serve as an indicator wheel of a position indicator, and in some illustrative examples, an HVAC actuator may include an indicator wheel operatively coupled to the output shaft 102 of the HVAC actuator that rotates with the output shaft 102 as a component of a position indicator that does not also serve as an aperture wheel.

In some cases, aperture wheel 136 may include one or more markings that move with the indicator wheel and that are viewable from the front side of the housing 106. Such markings may include a line 180 extending in a radial direction from the rotation axis of the aperture wheel 136 (see FIGS. 6-8 and 10A-10E). Line 180 and any other provided markings may be viewable through a window of the housing 106, such as window 182 of faceplate 130 (see FIG. 6). Window 182 may be a transparent solid material, but this is not necessary, and in other illustrative examples, a window for viewing markings of an indicator wheel may simply be an opening in a housing. In the example shown, faceplate 130 of housing 106 may include one or more position indicia 184 that may, when used in conjunction with the one or more markings of the indicator wheel such as line 180, indicate when the output shaft 102 is at one or more predetermined positions. For example, indicium "0" of indicia 184 may indicate when the output shaft is at a position corresponding to the second end of the range of motion, which may be when the damper is fully closed. The indicia "1", "2", and "3" of indicia 184 of the position indicator may indicate when the output shaft is at the stop positions corresponding to the "1", "2", and "3" indicia of indicator 112 of the range adjustment mechanism. For example, a technician may manipulate the range adjustment mechanism by moving range adjustment knob 110 of the range adjustment lever 111 to the position corresponding to indicium "1" of indicator 112. The range of motion of the output shaft 102 may then be limited to a range between fully open at 0 degrees and stop position "1", which may be at, for example, 80 degrees. As the output shaft is actuated in this range, line 180 may move with aperture wheel 136 such that at its furthest counter-clockwise rotation, it reaches indicium "1" of indicia 184 of the position indicator (as illustrated as an example in FIG. 6) but may not rotate further, as the motion of the output shaft is stopped by the range adjustment mechanism.

Aperture wheel 136 may be directly coupled to the output shaft 102 of the HVAC actuator 100 such that it rotates directly with the output shaft. When so provided, a given rotational displacement of the output shaft 102 may result in an identical rotation displacement of the aperture wheel 136. For example, 47 degrees of rotation of the output shaft 102 may be coupled directly to the aperture wheel 136 to result in an identical 47 degrees of rotation of the indicator wheel. During installation of the HVAC actuator 100, line 180 may be aligned with the plane of the damper blade 52 such that after installation, a technician may be able to immediately visually ascertain the actual angular disposition of the damper blade (which, being within the duct 30, may not be visible directly) simply from inspection of the position of line 180 of the position indicator, which may remain aligned with the plane of the damper blade.

Alternatively to a position indicator wheel such as wheel 136, other arrangements are contemplated. For example, FIG. 13 illustrates an aperture member 220 that translates rather than rotates. Aperture member 220 may also serve as a position indicating member and include one or more markings 226 that may be viewable from the front side of a housing of an HVAC actuator, and which may be used in conjunction with position indicia on the housing to provide an indication of the current position of an output shaft. In some illustrative examples, a translating position indicating member may be provided that is not also an aperture member.

The present disclosure contemplates a method for operating n HVAC actuator such as HVAC actuator 100 having the position indicator features described herein. The method may include the steps of rotating an output shaft 102 extending from a back side of the HVAC actuator 100 moving a position indicator in proportion to the rotation of the output shaft 102. The position indicator may have markings and/or indicia that indicate a current position of the output shaft 102. The method may also include the step of displaying the indicia of the position indicator through a window on a front side of the HVAC actuator. The position indicator may comprise an indicator wheel, and the moving step may comprise rotating the indicator wheel about a common rotation axis as the output shaft, but this is not required.

As discussed herein, an HVAC actuator of the present disclosure may be configured to selectively output rotational motion via an output shaft 102 in a first direction and a second direction. Generally, an HVAC actuator of the present disclosure may be electrically controllable. In some illustrative examples, electrical power for actuator operation and control signals may be provided separately. In some instances, the supply of electrical voltage and current at electrical terminals of an HVAC actuator may provide both the signal for a desired actuator operation and electrical power to implement that operation.

Some HVAC actuators that provide output rotational motion via an output shaft 102 in a first direction and a second direction require electrical power for motion in each direction, and may be referred to as bi-directionally powered actuators. Some bi-directionally powered actuators may be provided with three or more wiring terminals, including a common terminal, a first terminal for commanding rotation in the first direction, and a second terminal for commanding rotation in the second direction, whereupon when either of the first or second terminals is asserted by being supplied with appropriate voltage and/or current, an electric motor may drive the output shaft in the corresponding direction. A remote HVAC controller for such a bi-directionally powered HVAC actuator may be required to provide appropriate control signals to the three or more wiring terminals to achieve proper actuator operation in both the first and the second directions. Such a controller may be referred to as a bi-directional controller.

Some HVAC actuators may only require electrical power for motion in one of two directions, and may be referred to as uni-directionally powered actuators. Some uni-directionally powered actuators may be provided with only two wiring terminals, whereupon when the terminals are asserted by being supplied with appropriate voltage and/or current, an electric motor may drive the output shaft in one of the two directions. When electrical power is not asserted at the terminals, a return spring of the actuator may move the output shaft 102 in the other of the two directions. An advantage of a uni-directionally powered HVAC actuator is that it may provide "failsafe" operation. That is, in the event of power loss, the return spring may move the output shaft 102 to actuate the HVAC component (e.g., damper, valve, etc.) in a preferred power loss direction. As discussed elsewhere herein, such uni-directionally powered actuators may be available in "normally open" and "normally closed" versions, corresponding to the default state of the actuator in an unpowered or power loss condition. A remote HVAC controller for a such a uni-directionally powered actuator having only two wiring terminals may be configured to provide a control signal via two wires when motion in the electric motor driven direction is desired, and no signal when motion in the default return spring driven direction is desired. Such a controller may be referred to as a uni-directional controller. Faceplate 160 of FIG. 12 may be a component of a uni-directionally powered HVAC actuator having two wiring terminals. Markings 164 label the two wire terminals, which may be unpolarized. In an HVAC actuator having faceplate 160, single indicator window 162 may illuminate (whether blinking or continuously) only when power is applied to the actuator via the two wire terminals, and may remain un-illuminated when power is not applied via the two wire terminals.

In some cases, an HVAC controller that is configured to provide signals to a bi-directionally powered HVAC actuator via three wire terminals may be used to control a uni-directionally powered actuator that only includes two wire terminals. In such a case, two of three wire connections provided by the HVAC controller may be connected to the two wire terminals of the actuator: the common wire connection, and the appropriate one of the first or second direction wire connection, with the other direction wire connection being left unconnected. In such a case, when the actuator is not powered via the two wire terminals, the actuator may not provide any illuminated indications of actuator status.

The present disclosure contemplates uni-directionally powered HVAC actuators that include three wiring terminals, and which may be controlled either by a uni-directional HVAC controller with two wires, or by a bi-directional HVAC controller with three wires, and also include features to help prevent miss-wiring of the actuator.

Figure 14:
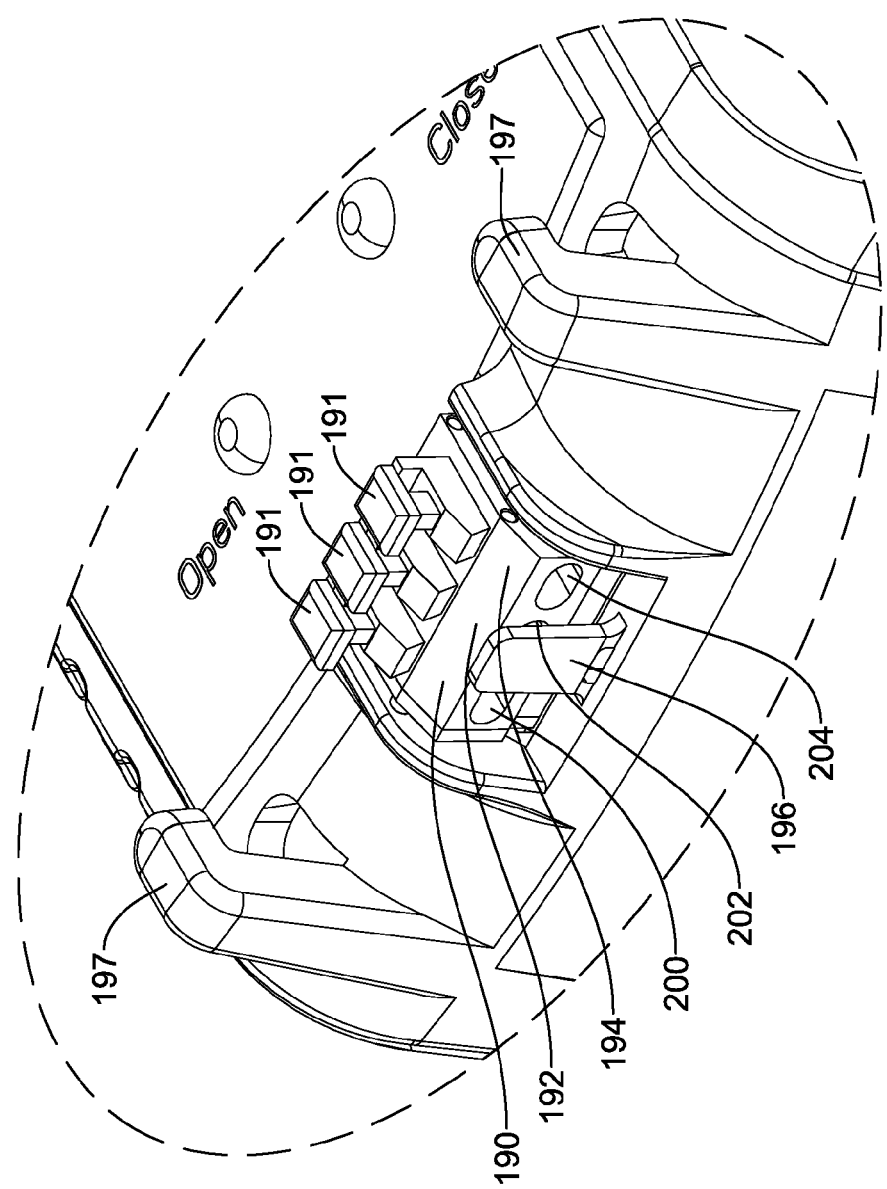
FIG. 14 is a schematic perspective view of the illustrative HVAC actuator of FIG. 1 showing details of a terminal block having a removable blocking tab.

FIG. 14 is a schematic perspective view of the illustrative HVAC actuator 100 showing details of three wiring terminals 190, 192, and 194. The three wiring terminals may be designated M1 (190), M4 (192), and M6 (194), as labeled on faceplate 130, but this is merely exemplary and is not required. HVAC actuator 100 may include a removable blocking tab 196 configured to block wire attachment to at least one of the wiring terminals. As illustrated, removable blocking tab 196 blocks wire attachment to wiring terminal 192, which is the second and middle of the three wiring terminals 190, 192, 194. However, any suitable wiring terminal or terminals may be blocked by one or more removable blocking tabs, depending on the configuration of the HVAC actuator. Removable blocking tab 196 may be a break-away tab, and may be referred to as a break-away blocking tab. Removable blocking tab 196 may be integral to housing 106. Removable blocking tab 196 may be configured such that once removed, it is not configured to be reattached. HVAC actuator 100 may be configured such that once a removable blocking tab, such as removable blocking tab 196, is removed, wire attachment to the previously blocked wire terminal(s) is/are no longer blocked.

In some cases, the removable blocking tab 196 may not be a break-away tab. In one example, the removable blocking tab may be hinged, and may be rotated out of the way by an installer to expose previously blocked wiring terminal(s). In another example, the removable blocking tab may be slide out of the way by the installer to expose previously blocked wiring terminal(s). These are just some examples.

FIG. 14 shows in illustrative HVAC actuator 100 with removable blocking tab 196 in place. The HVAC actuator may be suited for wired connection to a uni-directional HVAC controller that provides signals over two wires. The two unblocked wiring terminals M1 (190) and M6 (194) may receive the two wires from the uni-directional HVAC controller. HVAC actuator 100 may be configured with M1 (190) as electrical common, and M6 (194), when asserted, may cause the drive mechanism to drive the output shaft 102 toward the first end direction or position, which may be a more closed direction or position in comparison with the second end direction or position. However, in other examples, the first end direction or position may be a more open direction or position in comparison with the second end direction or position. HVAC actuator 100 may be configured to drive toward the first end direction with the two wires from the unidirectional controller attached to M1 (190) and M6 (194) with either polarity. When HVAC actuator 100 is powered via M1 (190) and M6 (194) to drive output shaft 102 toward the first end direction or position, the first light source 138 may be continuously illuminated or activated and the second light source 140 may be deactivated. When HVAC actuator 100 is not powered via M1 (190) and M6 (194), a return spring may drive the output shaft 102 toward the second end position, and first light source 138 may be non-illuminated. With terminal M4 (192) not asserted, as may be the case when it is blocked by removable blocking tab 196, second light source 140 may also be non-illuminated.

The same HVAC actuator 100, but configured with removable blocking tab 196 removed (not illustrated), may be suited for wired connection to a bi-directional HVAC controller that provides signals over three wires. In this instance, HVAC actuator 100 may be configured with M1 (190) as electrical common, and M6 (194), when asserted, may cause the drive mechanism to drive the output shaft 102 toward the first end direction or position, which may be a more closed direction or position in comparison with the second end direction or position. However, in other examples, the first end direction or position may be a more open direction or position in comparison with the second end direction or position. Additionally, when M6 (194) is asserted, the first light source 138 may be continuously illuminated or activated and the second light source 140 may be deactivated. When M6 (194) is not asserted, the first light source 138 may be deactivated and a return spring may drive the output shaft 102 toward the second end position. When M4 (192) is asserted, the second light source 140 may be continuously illuminated or activated, but there may be no electrical power applied to the drive mechanism of the HVAC actuator. Usually, if M4 (192) is asserted, the bi-directional controller will not also assert M6 (194), and the return spring may drive the output shaft 102 toward the second end position. However, if under unusual circumstances and both M4 (192) and M6 (194) are asserted, both first and second light sources 138, 140 may be illuminated, and the drive mechanism may drive the output shaft 102 toward the first end direction or position. In this unusual circumstance, upon the output shaft 102 reaching the first end or a first stop position and ceasing motion, the pattern of openings 151-156 of aperture member/wheel 136 may result in the appearance of first light in first window 132 and non-appearance of light in second window 134 to an observer viewing the front of the housing 106. Before the output shaft 102 ceases motion in this unusual circumstance, blinking of light may be observed in both first and second windows 132, 134, indicating a wiring or other error condition.

The inclusion of removable blocking tab 196 in the design of HVAC actuator 100 may help reduce the chance of miss-wiring the HVAC actuator. By default, the HVAC actuator 100 may be provided to a technician with removable blocking tab 196 intact. If using a uni-directional HVAC controller that provides two wires to control the actuator, then with removable blocking tab 196 in place, only two wiring terminals, for example M1 (190) and M6 (194), are readily accessible and the wires from the uni-directional HVAC controller may be coupled to these unblocked terminals without confusion. The removable blocking tab 196 may help prevent miss-wiring to the blocked wiring terminal, for example, M4 (192). If, on the other hand, a bi-directional HVAC controller that provides three wires is used, the removable blocking tab 196 may be removed, and the three wires may be coupled to the appropriate wiring terminals 190, 192, 194.

HVAC actuator 100 may include wire guides 200, 202, 204 associated with each of wire terminals 190, 192, 194. Each wire guide 200, 202, 204 may be regarded as an integral component of each wire terminal 190, 192, 194, or it may be regarded as a separate accessory for its associated wire terminal. Each wire guide 200, 202, 204 may define an aperture for receiving and guiding an end of a corresponding wire to a corresponding one of the wiring terminals 190, 192, 194. First, second, and third wire guides 200, 202, 204 may be formed from a common part. A removable blocking tab may be situated in front of the aperture of a wire guide corresponding to a wire terminal 190, 192, 194 to help prevent inadvertent connection of a wire to that terminal. For example, removable blocking tab 196 may be situated in front of the aperture of wire guide 202 of second wire terminal M4 (192) to help prevent inadvertent connection of an improper wire to the second wire terminal, for example, in a case where a uni-directional HVAC controller that provides two wires is employed to control the HVAC actuator 100.

Each wire terminal 190, 192, 194 may be configured to allow a wire to be inserted manually without the aid of tools, and, after insertion, to retain the wire firmly. Each wire terminal 190, 192, 194 may include a corresponding release button 191 that, when pressed, actuates a release mechanism that allows insertion and removal of a wire from the terminal without tools. In some instances, HVAC actuator 100 may include integrated wire strain relief features. For example, HVAC actuator 100 may include wire wrap posts 197, around which wires attached to the wire terminals 190, 192, 194 may be wrapped. Wrapping a wire attached to a wire terminal 190, 192, 194 around a post 197 may isolate or buffer the end of the wire inserted into the terminal from mechanical forces applied to the wire on the other side of the wrap around the post, helping to prevent undesired detachment of the wire from the terminal.

The present disclosure contemplates a method for connecting two or more wires to an HVAC device, such as HVAC actuator 100, including the step of identifying which of two or more wiring terminals of the HVAC device need to be connected to a wire. At least one of the two or more wiring terminals of the HVAC device may have a removable blocking tab that blocks access to the corresponding wiring terminal. If a wire needs to be connected to the at least one of the two or more wiring terminals that has a removable blocking tab that blocks access to the corresponding wiring terminal, the method may include the step of removing the removable blocking tab and then connecting a wire to the corresponding wiring terminal. The removable blocking tab may be a break-away blocking tab, in which case removing the removable blocking tab may include breaking away the break-away blocking tab. A break-away blocking tab, once broken-away, may not be configured to be reattached. If a wire needs to be connected to one or more of the two or more wiring terminals that does not have a removable blocking tab that blocks access to the corresponding wiring terminal, the method may include the step of connecting a wire to the corresponding wiring terminal.

HVAC actuator 100 may include a controller for controlling the drive mechanism, the first light source 138 and the second light source 140. The controller may be disposed on a circuit board 142. The controller may be configured to activate the first light source 138 and deactivate the second light source 140 when the drive mechanism is driving the output shaft 102 toward the first end position. The controller may further be configured to activate the second light source 140 and deactivate the first light source 138 when the output shaft 102 is moved toward the second end position. Output shaft 102 may be moved toward the second end position as a result of force exerted by a return spring 306. Alternately, in another example, the drive mechanism may be configured to selectively drive the output shaft 102 toward the second end position, and the controller may activate the second light source 140 and deactivate the first light source 138 when the drive mechanism is driving the output shaft toward the second end position.

Figure 15:
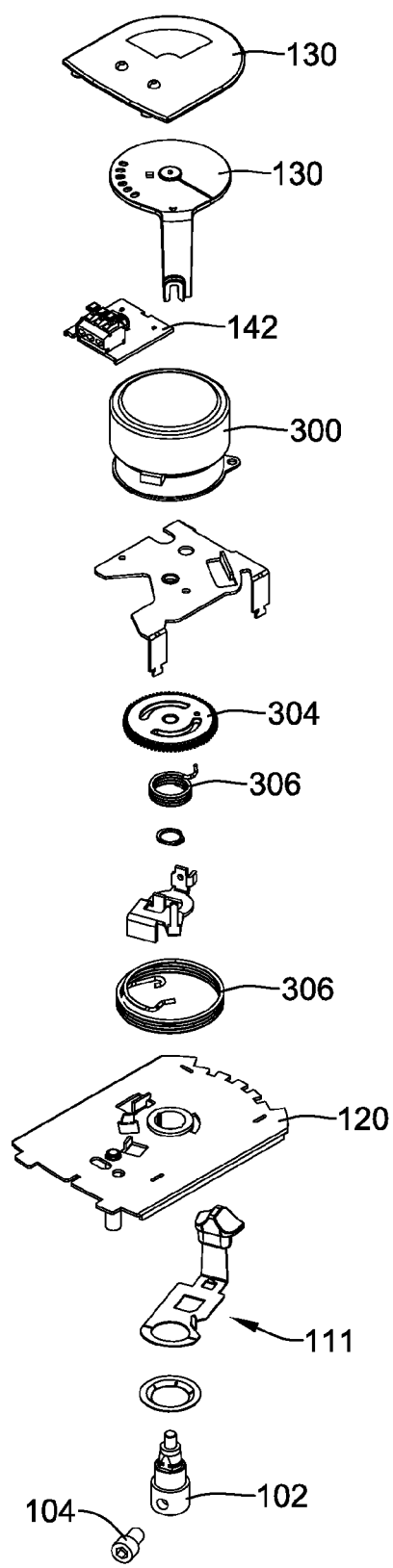
FIG. 15 is a schematic partial exploded view of the illustrative HVAC actuator of FIG. 1.

FIG. 15 is a schematic partial exploded view of illustrative HVAC actuator 100. Housing 106 is omitted in FIG. 15. The drive mechanism of HVAC actuator 100 may include an electric motor 300 having an output gear (not visible in this view) coupled to a drive gear 304, which may be rigidly fixed to output shaft 102. The drive mechanism may be configured to drive the output shaft 102 in only a single direction, for example, in a first direction which may be a damper or valve more closed direction. Return spring 306 may be configured to exert a torque on the output shaft 102 that tends to move the output shaft in a second direction, which may be a damper or valve more open direction. When the electric motor 300 of the drive mechanism is powered, the resultant torque of the drive mechanism on the output shaft 102 may overcome the torque exerted by the return spring 306 such that the output shaft rotates in the first direction, or, if the output shaft has reached the first end or a first stop, it is maintained at that end or stop position against the torque exerted by the return spring. When the electric motor 300 of the drive mechanism is not powered, the torque exerted by the return spring 306 may be sufficient to rotate the output shaft 102 in the second direction and/or maintain the output shaft at the second end or a second stop.

The disclosure should not be considered limited to the particular examples described above, but rather should be understood to cover all aspects of the disclosure and equivalents thereof. Various modifications, equivalent processes, as well as numerous structures to which the disclosure can be applicable will be readily apparent to those of skill in the art upon review of the instant specification.

What is claimed is:

1. An HVAC actuator coupleable to an HVAC component disposed in or at an insulated duct, wherein the insulated duct includes a duct having a duct wall, an outer surface of the duct, an insulating layer around the outer surface of the duct, and an outer surface of the insulating layer, the HVAC actuator comprising:
   a coupling mechanism configured to couple the HVAC actuator to the HVAC component;
   a housing having a back side facing the duct and a front side facing away from the duct; and
   a taping flange that is configured to extend transversely away from the housing and provides a taping surface facing away from the duct, the taping flange is further configured to be spaced from the outer surface of the duct and adjacent to the outer surface of the insulated layer of the duct when the HVAC actuator is coupled to the HVAC component.

2. The HVAC actuator of claim 1, wherein the taping flange is configured to facilitate taping of the HVAC actuator to the outer surface of the insulating layer.

3. The HVAC actuator of claim 2, wherein the taping flange is shaped to provide a front-facing surface that is suitable for receiving tape to provide a seal between the taping flange and the outer surface of the insulating layer.

4. The HVAC actuator of claim 1, wherein the taping flange extends outward from the housing around the entire perimeter of the housing.

5. The HVAC actuator of claim 4, wherein the taping flange extends outward from the housing by at least 5 mm around the entire perimeter of the housing.

6. The HVAC actuator of claim 1, wherein the taping flange extends outward from the housing approximately perpendicular to adjacent side walls of the housing.

7. The HVAC actuator of claim 1, wherein the front-facing surface of the flange is disposed between the front side and back side of the housing.

8. The HVAC actuator of claim 1, wherein the flange is disposed substantially in registration with the back side of the housing.

9. The HVAC actuator of claim 1, wherein the taping flange is formed integrally with the housing.

10. The HVAC actuator of claim 1, wherein the taping flange is formed separately from the housing and coupled to the housing.

11. The HVAC actuator of claim 1, further comprising:
    an output shaft;
    a drive mechanism for rotating the output shaft;
    a controller for controlling the drive mechanism;
    wherein the coupling mechanism of the HVAC actuator is configured to operatively couple the output shaft of the HVAC actuator to an input shaft of the HVAC component when the HVAC actuator is coupled to the HVAC component; and
    a stop that is configured to engage the duct wall when the HVAC actuator is coupled to the HVAC component, the stop preventing the HVAC actuator from rotating relative to the HVAC component when the drive mechanism of the HVAC actuator is rotating the output shaft.

12. The HVAC actuator or claim 11, wherein the back wall of the housing is configured to be spaced from the outer surface of the duct, and the stop is configured to extend out away from the back wall of the housing towards the duct to engage the duct wall when the HVAC actuator is coupled to the HVAC component.

13. The HVAC actuator or claim 11, wherein the HVAC component is a damper positionable within the duct with the input shaft extending out of the duct wall through an aperture in the duct wall.

14. An HVAC actuator coupleable to an HVAC component disposed in or at an insulated duct, wherein the insulated duct includes a duct having duct walls, an outer surface of the duct, an insulating layer around the outer surface of the duct, and an outer surface of the insulating layer, the HVAC actuator comprising:
- an output shaft;
- a drive mechanism for rotating the output shaft;
- a controller for controlling the drive mechanism;
- a coupling mechanism configured to operatively couple the output shaft of the HVAC actuator to an input shaft of the HVAC component when the HVAC actuator is coupled to the HVAC component;
- a stop that is configured to engage the duct wall when the HVAC actuator is coupled to the HVAC component, the stop preventing the HVAC actuator from rotating relative to the outer surface of the duct when the drive mechanism of the HVAC actuator is rotating the output shaft; and
- a taping flange configured to be spaced from the outer surface of the duct and adjacent to the outer surface of the insulated layer of the duct when the HVAC actuator is coupled to the HVAC component.

15. The HVAC actuator or claim 14, further comprising a housing having a back side facing the duct and a front side facing away from the duct, wherein the taping flange extends outward from the housing and provides a front-facing surface that is suitable for receiving tape to provide a seal between the taping flange and the outer surface of the insulating layer.

16. The HVAC actuator of claim 15, wherein the taping flange is formed integrally with the housing.

17. The HVAC actuator of claim 15, wherein the taping flange is formed separately from the housing and coupled to the housing.

18. A method for installing an HVAC actuator for driving an HVAC damper that is disposed in an insulated duct, wherein the insulated duct includes a duct having a duct wall, an outer surface of the duct, an insulating layer around the outer surface of the duct, and an outer surface of the insulating layer, the HVAC damper having an input shaft extending though the duct wall, the method comprising:
- operatively coupling an output shaft of the HVAC actuator to the input shaft of the HVAC damper; and
- providing tape between a taping flange of the HVAC actuator and the outer surface of the insulating layer of the duct to form a seal.

19. The method of claim 18, further comprising:
- inserting a stop of the HVAC actuator through an aperture in the duct wall before operatively coupling the output shaft of the HVAC actuator to the input shaft of the HVAC damper.

20. The method of claim 18 further comprising tucking at least part of the insulating layer under the taping flange before providing tape between the taping flange of the HVAC actuator and the outer surface of the insulating layer of the duct to form a seal.

* * * * *